(12) United States Patent
Matsuura et al.

(10) Patent No.: US 6,985,634 B2
(45) Date of Patent: Jan. 10, 2006

(54) IMAGE PROCESSING SYSTEM FOR COMPRESSING IMAGE DATA INCLUDING BINARY IMAGE DATA AND CONTINUOUS TONE IMAGE DATA BY A SUB-BAND TRANSFORM METHOD WITH A HIGH-COMPRESSION RATE

(75) Inventors: Nekka Matsuura, Tokyo (JP); Yukiko Yamazaki, Kanagawa (JP); Takahiro Yagishita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/730,019

(22) Filed: Dec. 9, 2003

(65) Prior Publication Data

US 2004/0114819 A1 Jun. 17, 2004

Related U.S. Application Data

(62) Division of application No. 10/423,911, filed on Apr. 28, 2003, now Pat. No. 6,714,685, which is a division of application No. 10/175,838, filed on Jun. 21, 2002, now abandoned, which is a division of application No. 09/630,600, filed on Aug. 1, 2000, now Pat. No. 6,577,812, which is a division of application No. 09/073,873, filed on May 7, 1998, now Pat. No. 6,459,816.

(30) Foreign Application Priority Data

| May 8, 1997 | (JP) | 9-118207 |
| May 29, 1997 | (JP) | 9-156006 |
| May 29, 1997 | (JP) | 9-156007 |

(51) Int. Cl.
*G06K 9/36* (2006.01)

(52) U.S. Cl. ........................ 382/248; 382/251
(58) Field of Classification Search ......... 382/239–240, 382/248, 250–251, 253, 232, 270, 199, 243; 375/240.01–240.03, 240.11, 240.18–240.24, 375/240.08; 358/426.01, 426.02, 426.12–426.16
See application file for complete search history.

(56) References Cited

U.S. PATENT DOCUMENTS 5,086,488 A * 2/1992 Kato et al. .................. 382/239
5,253,075 A 10/1993 Sugiyama
5,301,032 A * 4/1994 Hong et al. ................. 382/250
5,345,317 A 9/1994 Katsuno et al.
5,432,870 A 7/1995 Schwartz
5,442,459 A 8/1995 Gahang
5,539,842 A 7/1996 Schwartz
5,729,633 A * 3/1998 Watanabe et al. ........... 382/239
5,818,974 A 10/1998 Kimura et al.
5,841,473 A 11/1998 Chui et al.
5,881,176 A 3/1999 Keith et al.
5,909,518 A 6/1999 Chui
6,400,844 B1 6/2002 Fan et al.
6,459,816 B2 10/2002 Matsumura et al.
6,603,884 B2 8/2003 Matsuura et al.

FOREIGN PATENT DOCUMENTS

| JP | 62-193382 | 8/1987 |
| JP | 1-135265 | 5/1989 |
| JP | 2-305272 | 12/1990 |
| JP | 4-144485 | 5/1992 |
| JP | 4-315371 | 11/1992 |
| JP | 05-176180 | 7/1993 |
| JP | 06-350992 | 12/1994 |
| JP | 7-74959 | 3/1995 |
| JP | 7/87327 | 3/1995 |
| JP | 7-95579 | 4/1995 |
| JP | 08-186715 | 7/1996 |
| JP | 09-187005 | 7/1997 |

OTHER PUBLICATIONS

U.S. Appl. No. 10/730,019, filed Dec. 9, 2003, Matsuura et al.
U.S. Appl. No. 10/986,781, filed Nov. 15, 2004, Matsuura et al.

* cited by examiner

*Primary Examiner*—Amelia M. Au
*Assistant Examiner*—Ishrat Sherali
(74) *Attorney, Agent, or Firm*—Oblon, Spivak, McClelland, Maier & Neustadt, P.C.

(57) ABSTRACT

An image processing system which compresses an image including both a binary image and a continuous tone image by a sub-band transform method with a high compression rate. A 2×2 pixel matrix block is extracted from image data. A transform factor having a plurality of frequency components is obtained from the 2×2 pixel matrix block data. The transform factor is quantized by a fixed-length quantizing method by deleting a predetermined number of lower order bits of each of the frequency components.

5 Claims, 22 Drawing Sheets

HARR WAVELET TRANSFORM

| HL | LH | HH | CODE |
|---|---|---|---|
| 0 | 0 | 0 | 0 |
| 32 | 0 | 0 | 1 |
| -32 | 0 | 0 | 2 |
| 0 | 32 | 0 | 3 |
| 0 | -32 | 0 | 4 |
| 64 | 0 | 0 | 5 |
| -64 | 0 | 0 | 6 |
| 0 | 64 | 0 | 7 |
| 0 | -64 | 0 | 8 |
| 128 | 0 | 0 | 9 |
| -128 | 0 | 0 | 10 |
| 0 | 128 | 0 | 11 |
| 0 | -128 | 0 | 12 |
| 32 | 32 | 0 | 13 |
| -32 | -32 | 0 | 14 |
|  |  |  | 15 (NOT USED) |

FIG.13

| AREA | EDGE | NON-EDGE |
|---|---|---|
| DETERMINING METHOD | \|HL\|≧64 OR \|LH\|≧64 | OTHER THAN EDGE AREA |
| FLAG(1 BIT) | 1 | 0 |
| QUANTIZING METHOD | LL···DIVIDE BY 4 (6 BITS)<br>HL,LH···DIVIDE BY 64 (3 BITS)<br>HH··· 0 (0 BIT)<br>(TOTAL 13 BITS) | LL···DIVIDE BY 4 (6 BITS)<br>HL,LH···DIVIDE BY 16 (3 BITS)<br>HH··· 0 (0 BIT)<br>(TOTAL 13 BITS) |

FIG.15
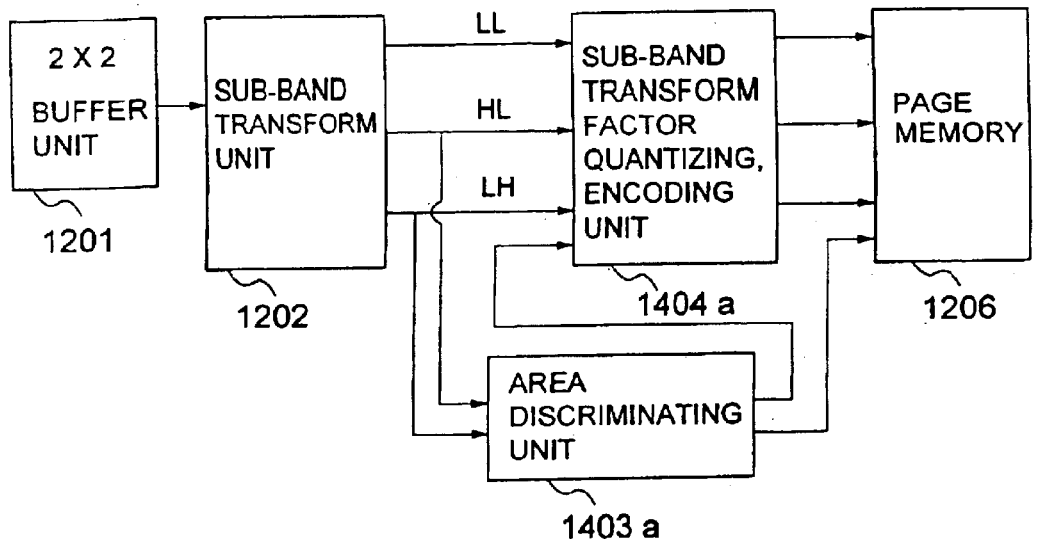
FIG.16
| AREA | EDGE | NON-EDGE |
|---|---|---|
| DETERMINING METHOD | $|HL|\geq 16$ OR $|LH|\geq 16$ | OTHER THAN EDGE AREA |
| FLAG(1 BIT) | 1 | 0 |
| QUANTIZING METHOD | LL···DIVIDE BY 16 (4 BITS)<br>HL,LH···DIVIDE BY 32<br>(4 BITS)<br>HH··· 0 (0 BIT)<br>(TOTAL 13 BITS) | LL···DIVIDE BY 4 (6 BITS)<br>HL,LH···DIVIDE BY 4<br>(3 BITS)<br>HH··· 0 (0 BIT)<br>(TOTAL 13 BITS) |
FIG.17A
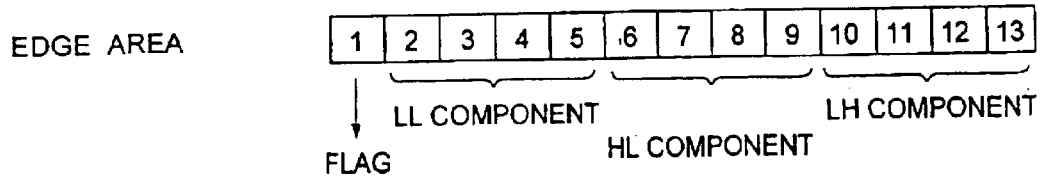
EDGE AREA
FIG.17B
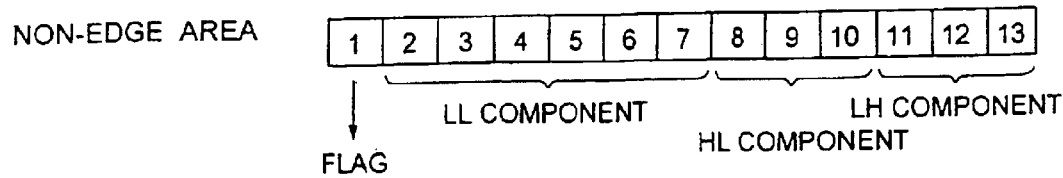
NON-EDGE AREA

FIG.21

| AREA | EDGE | NON-EDGE |
|---|---|---|
| DETERMINING METHOD | $|HL| \geq 16$ OR $|LH| \geq 16$ | OTHER THAN EDGE AREA |
| FLAG | TWO LSBs ARE NOT "00" | TWO LSBs ARE "00" |
| QUANTIZING METHOD | ① LL…DIVIDE BY 16 (4 BITS)<br>② HIGH-FREQUENCY COMPONENTS…VECTOR QUANTIZATION BY 4 BITS<br>MULTIPLE OF 4 IS NOT USED<br>(TOTAL 8 BITS) | ① LL…DIVIDE BY 4 (6 BITS)<br>② HIGH-FREQUENCY COMPONENTS…ASSIGNED 2 BITS ONLY "00" IS USED FOR HL, LH, HH<br>(TOTAL 8 BITS) |

FIG.22A

EDGE AREA (|HL|≧16 OR |LH|≧16):

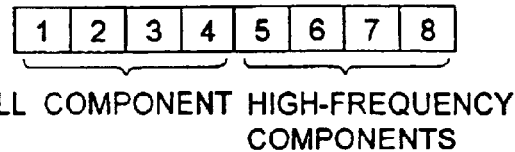

LL COMPONENT   HIGH-FREQUENCY
               COMPONENTS

FIG.22B

NON-EDGE AREA(OTHER THAN EDGE AREA):

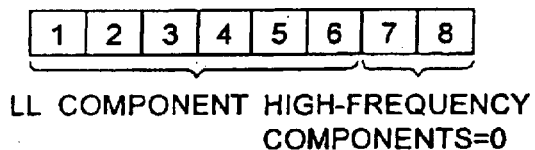

LL COMPONENT   HIGH-FREQUENCY
               COMPONENTS=0

FIG.22C

FLAG: TWO LOWER ORDER BITS ARE "00"... NON-EDGE AREA
OTHER THAN NON-EDGE AREA ... EDGE AREA

FIG.22D

CORRESPONDENCE TABLE OF CODES AND VECTOR CODES (HL,LH,HH):

| HIGH-FREQUENCY COMPONENTS CODE | EDGE (16,4 BITS) | NON-EDGE (4,2 BITS) |
|---|---|---|
| 0 | NOT USED | (0, 0, 0) |
| 1 | (16, 0, 0) | NOT USED |
| 2 | (-16, 0, 0) | NOT USED |
| 3 | (0, 16, 0) | NOT USED |
| 4 | NOT USED | |
| 5 | (0, -16, 0) | |
| 6 | (64, 0, 0) | |
| 7 | (-64, 0, 0) | |
| 8 | NOT USED | |
| 9 | (0, 64, 0) | |
| 10 | (0, -64, 0) | |
| 11 | (128, 0, 0) | |
| 12 | NOT USED | |
| 13 | (-128, 0, 0) | |
| 14 | (0, 128, 0) | |
| 15 | (0, -128, 0) | |

EDGE AREA :

MSB 4 BITS OF LL COMPONENT    VECTOR QUANTIZED VALUE OF HIGH-FREQUENCY COMPONENTS

NON-EDGE AREA :

MSB 6 BITS OF LL COMPONENT    0 0

EDGE AREA :

MSB 4 BITS OF LL COMPONENT    VECTOR QUANTIZED VALUE OF HIGH-FREQUENCY COMPONENTS

NON-EDGE AREA :

MSB 4 BITS OF LL COMPONENT    0 0    FIFTH AND SIXTH BITS FROM MSB OF LL COMPONENT

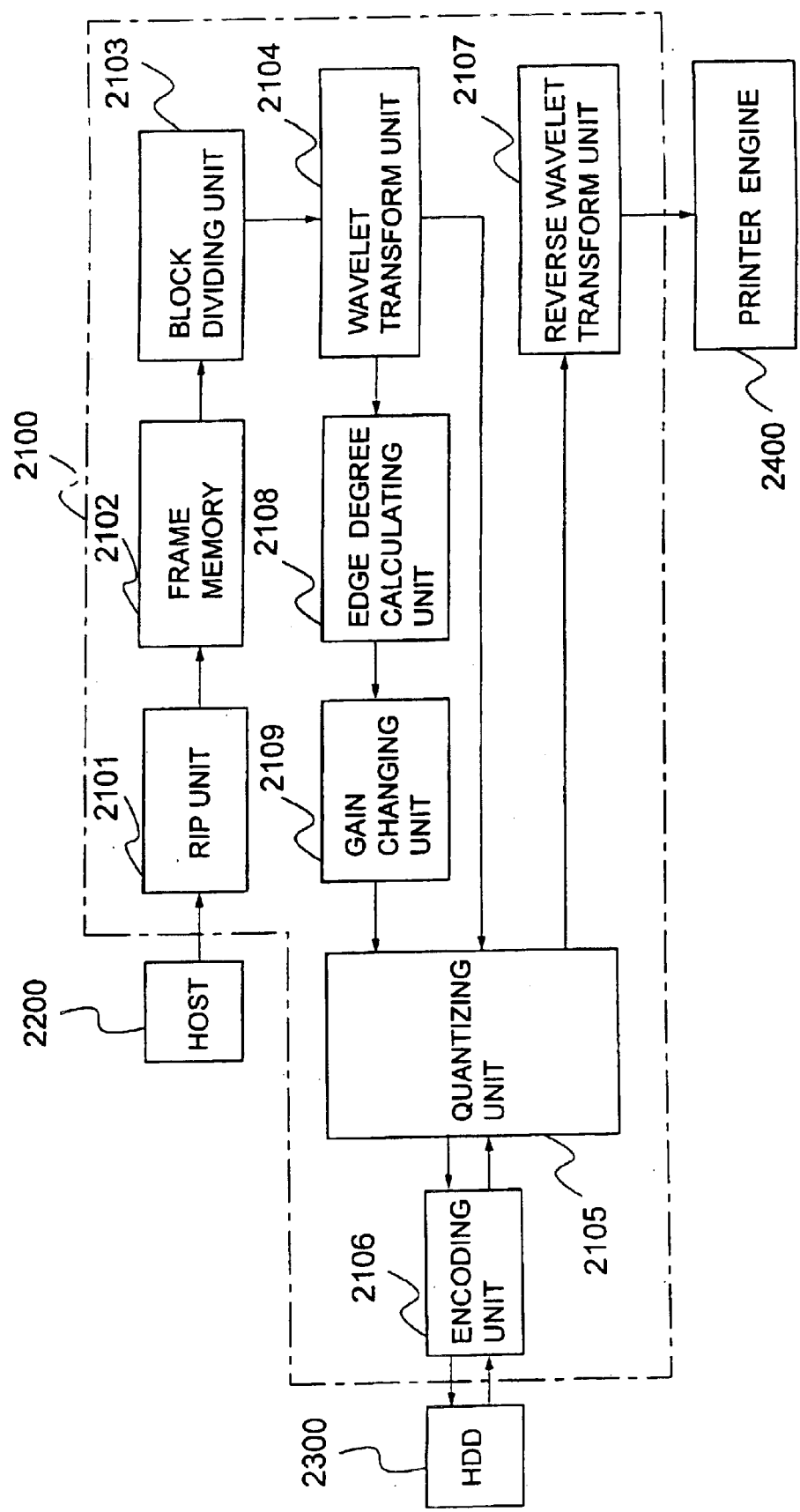

GAIN=2.0

GAIN=1.0

GAIN=0.5

$$\text{THRESHOLD VALUE} = \frac{\text{THRESHOLD VALUE AT GAIN}=1}{\text{GAIN}}$$

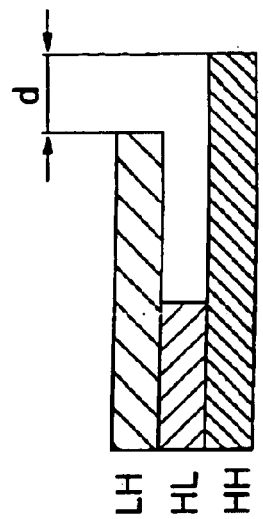
FIG.30C  NATURAL EDGE AREA
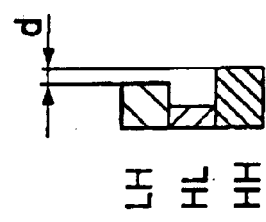
FIG.30B  NON-EDGE AREA
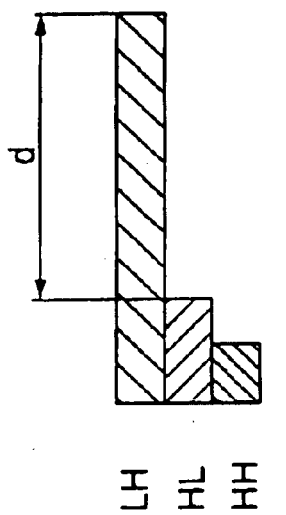
FIG.30A  EDGE AREA

7-VALUE VECTOR QUANTIZATION

15-VALUE VECTOR QUANTIZATION

| | | | | | |
|---|---|---|---|---|---|
| LOW-FREQUENCY FACTOR | L<br>L<br>L | 3 BITS | H<br>H<br>H | HIGH-FREQUENCY FACTOR | LEVEL 2 IMAGE |
| HIGH-FREQUENCY FACTOR | H<br>H<br>H<br>H | 4 BITS | L<br>L<br>L<br>L | LOW-FREQUENCY FACTOR | LEVEL 3 IMAGE |
| AREA INFORMATION | 1 | 1 BIT | 0 | AREA INFORMATION | |

EDGE AREA BLOCK     IMAGE AREA BLOCK

IMAGE PROCESSING SYSTEM FOR COMPRESSING IMAGE DATA INCLUDING BINARY IMAGE DATA AND CONTINUOUS TONE IMAGE DATA BY A SUB-BAND TRANSFORM METHOD WITH A HIGH-COMPRESSION RATE

This application is a divisional of U.S. Ser. No. 10/423,911, filed on Apr. 28, 2003 now U.S. Pat. No. 6,714,685, which is divisional of U.S. Ser. No. 10/175,838, filed on Jun. 21, 2002 now abandoned which is divisional of U.S. Ser. No. 09/630,600, filed on Aug. 1, 2000, now U.S. Pat. No. 6,577,812, which is divisional of U.S. Ser. No. 09/073,873, filed on May 7, 1998, now U.S. Pat No. 6,459,816 and under 35 USC §119 from Japanese Patent Application Nos. 9-118207, filed May 8, 1997, 9-156006, filed May 29, 1997 and 9-156007 filed May 29, 1997, the entire contents of which are incorporated herein by reference.

BACKGROUND OF THE INVENTION

1. Field of the Invention

The present invention generally relates to an image data compressing technique and, more particularly, to an image processing system which compresses and expands image data by using a sub-band encoding method.

The image processing system related to the present invention may be used in a digital copy machine, a facsimile machine, a digital printer, a digital camera or a digital video camera, and also may be used in an image recording system such as a CD-ROM drive or a floppy disc drive.

2. Description of the Related Art

A sub-band encoding method such as the discrete cosine transform (DCT) or the Harr Wavelet transform is considered a method for effectively compressing a continuous tone image. Additionally, Japanese Laid-Open Patent Application No. 2-305272 discloses another method for encoding image data by separating an image area into a character area and a halftone area so as to encode these areas by an encoding method appropriate for each of the areas.

Such a method for compressing image data using the sub-band transform such as the DCT or the Harr Wavelet transform can effectively compress a continuous tone image. However, there is a problem in that a compression rate is low when a complete binary image is compressed.

Additionally, in a digital copy machine, even if an original image is a complete binary image, image data obtained by scanning such a complete binary image may become incomplete binary image data due to fluctuation in a scanning operation. Thus, there may be a problem in compressing such incomplete binary data by an entropy-encoding method due to fluctuation in a scanned image.

As a method for rotating or sorting images in a copy machine, a block truncation encoding (BTC) which is one of fixed length encoding methods is popular. However, there is a problem in that a compression rate for an entropy encoding is low as compared to that of a sub-band transform method, and a calculation is complex.

In an image forming apparatus such as a copy machine or a printer, image data obtained by a scanner is subjected to gamma correction or a filtering process so as to adjust image quality. The thus-processed image data is stored in a memory, and then the image data is sent to a printing unit.

Generally, such image data is subjected to a data compression in order to reduce a capacity of the memory that stores the processed image data. Generally, in a data compressing method, image data is transformed into frequency components by using an orthogonal transformation such as the discrete cosine transform (DCT), and the quantized image data is subjected to an entropy encoding. Dispersion of a high-frequency factor in the frequency transformation factors varies in response to a magnitude of change in intensity of the image. Thus, the image quality is improved when a quantizing method is changed in response to a type of an area to be processed.

Japanese Laid-Open Patent Application No. 7-74959 discloses a technique in which a quantization table is changed based on a transform factor obtained by an orthogonal transformation of an original image by each individual block so that the image quality matches the contents of the image data and a compression rate is improved.

When an image is printed by a copy machine, a character image and a line image can be well recognized by rendering the intensity slope of a contour of the characters or the lines to be steep. On the other hand, when an image having a gentle intensity slope such as a photograph is printed, a random change in the intensity having a small amplitude is sensed as a noise. Thus, it is preferred for such a photographic image to reduce the intensity slope of an output image. Particularly, in a mesh point photographic image, a better image quality can be obtained by reducing the intensity slope even for an area having a steep intensity slope.

Accordingly, an edge area corresponding to a character image or a line image is separated from a mesh point image and a gentle slope area of a photographic image so that the edge area is subjected to a differential filtering process whereas the photographic image is subjected to a smoothing filtering process. Additionally, when an image data compression is performed, another separation of image areas is performed in response to degrees of the intensity slope in edge areas.

As mentioned above, in the conventional technique, two separation processes are performed on the same image data and the filtering process is performed separately from the quantizing process. Thus, there is a problem in that a process time is increased and a hardware cost is increased. Additionally, there is a disadvantage in the technique disclosed in the above-mentioned patent document in that a compression rate is not minimized since a result of the area separation must be also stored as the compressed data.

An image data compression technique is generally used in the image data processing field so as to reduce a capacity of a memory for storing image data or reduce a time for transmitting image data. There are various image data compressing methods depending on the processing modes of image data. When image data is printed, a rotation of the image may be requested. In order to rotate the image at a high speed, a fixed length compression is used.

Additionally, when image data is exchanged between systems having different resolutions or gradation characteristics, a compressing method using a layered data structure is desired so as to select transmission data corresponding to an image quality of an image outputting system. Especially, when image data is transmitted to a display apparatus, a progressive transmission method is required. In the progressive transmission method, image data of an object such as an icon can be transmitted prior to sending the image data. Thus, data compression is performed in response to the level of layers.

Additionally, when a trial printing is performed for checking a layout while reducing toner consumption in an image printing apparatus, a data compressing method is required by which a feature of the image is maintained but image quality is not reduced.

Japanese Laid-Open Patent Application No. 1-135265 discloses a data compressing method in which an original image is divided into a plurality of blocks, and each block is divided into image data which is orthogonal-transformed and other data so that a representative image of the image file can be effectively regenerated.

Generally, an image comprises an image area and an edge area. In the image area, a gradation of the image gradually changes, such as in a photograph or a graphic image. In the edge area, a gradation sharply changes in an area of an edge of the image and an area adjacent to the edge, such as in a character image or a line image. When the visual sense of human beings is considered, gradation is important in the image area whereas resolution is important in the edge area.

In the conventional technique disclosed in the above-mentioned patent document, a sampling is performed on the original image, and the sampled image data is subjected to the discrete cosine transform (DCT). The same transform factor which is obtained from a quantization table is used for all areas. In such a case, a length of data is fixed since a single quantization table is used. However, there is a drawback in that the quantized image data does not accurately represent the feature of the image while a large amount of data is used since a single quantization is used. Additionally, there is a disadvantage in that only two levels of image data can be selected.

SUMMARY OF THE INVENTION

It is a general object of the present invention to provide an improved and useful image processing system in which the above-mentioned problems are eliminated.

A more specific object of the present invention is to provide an image processing system which compresses an image including both a binary image and a natural image by a sub-band transform method with a high compression rate.

Another object of the present invention is to provide an image processing system which facilitates processing and editing of image data by using a sub-band transform method or a fixed length encoding method at a low cost.

A further object of the present invention is to provide an image processing system which can represent a feature of an image while a reduced amount of data is used, and which can produce image data including a plurality of levels of image quality.

In order to achieve the above-mentioned objects, there is provided according to one aspect of the present invention an image processing system comprising:

a buffer unit extracting n×m pixel matrix block data from image data, where n and m are integers;

a sub-band transform unit transforming the n×m pixel matrix block data by a sub-band transform method so as to obtain a transform factor having a plurality of frequency components; and a quantizing unit quantizing the transform factor by a fixed-length quantizing method by deleting a predetermined number of lower order bits of each of the frequency components.

According to the above-mentioned invention, since the high-frequency component of the sub-band transform factor is quantized by deleting the lower order bits in the fixed-length quantizing method, various subsequent processes such as editing of the image or a rotation of the image can be easily performed with a reduced amount of compressed data.

Additionally, there is provided according to another aspect of the present invention an image processing system comprising:

a buffer unit extracting n×m pixel matrix block data from image data, where n and m are integers;

a sub-band transform-unit transforming the n×m pixel matrix block data by a sub-band transform method so as to obtain a transform factor having a plurality of frequency components including a low-frequency component and a high-frequency component;

an area discriminating unit discriminating a type of an image area corresponding to the n×m pixel matrix block data being processed so that the image area is determined as one of an edge area and a non-edge area, a discrimination being made based on whether or not an absolute value of each of the components of the transform factor exceeds a threshold value; and a quantizing unit quantizing the transform factor by a fixed-length quantizing method by deleting a predetermined number of lower order bits of each of the frequency components, the number of deleted lower order bits of each of the frequency components of the transform factor being changed in accordance with a type of image area being processed so that image data including the transform factor and flag information indicating a type of image area has a predetermined fixed length.

According to this invention, a number of the lower order bits of each of the frequency components of the transform factor is deleted in response to a type of the image, and the transform factor is quantized by a fixed-length quantizing method together with the flag information. Thus, the image data can be efficiently compressed with a high quality irrespective of whether the image data corresponds to an edge area or a non-edge area. Additionally, the original image data can be easily restored on a decoder side based on the flag information.

In the above-mentioned invention, the quantizing unit may delete lower order bits of each of the low-frequency component and the high-frequency component so that a number of deleted lower order bits for the edge area is greater than a number of deleted lower order bits for the non-edge area. Accordingly, data corresponding to both the edge area in which a gradation is important and the non edge area in which recognition of an edge is important can be efficiently compressed while a high image quality is maintained. Additionally, the original image data can be easily restored on a decoder side based on the flag information.

Additionally, the quantizing unit may quantize the high-frequency component by a vector quantizing method. Further, the quantizing unit may embed the flag information into the transform factor.

Additionally, the quantizing unit may change bit data representing the transform factor so that the flag information is represented by a part of the data bits representing the transform factor. The quantizing unit may change the transform factor so that correlation between the transform factors of different types is increased. The quantizing unit may change a bit arrangement of the transform factor so that correlation between the transform factor corresponding to the edge area and the transform factor corresponding to the non-edge area is increased.

Additionally, there is provided according to another aspect of the present invention an image processing system comprising:

a buffer unit extracting n×m pixel matrix block data from image data, where n and m are integers;

a binarizing unit transforming the n×m pixel matrix block data into binary data represented by a maximum value and a minimum value;

a differential data calculating unit calculating differential data which is a difference between a value of each pixel in the n×m pixel matrix block data and one of the maximum value and the minimum value of the binary data;

a sub-band transform unit transforming the differential data by a sub-band transform method so as to obtain a transform factor having a plurality of frequency components; and an encoding unit encoding the binary data and the sub-band transform factor so as to obtain a code representing the image data.

According to the above-mentioned invention, a continuous tone image data can be efficiently compressed by a sub-band transform since the original image data is represented by using the binary data and the sub-band transform factor which are encoded by a sub-band transform. Accordingly, an image including a binary image and a continuous tone image can be processed by a single method irrespective of types of the image.

In the above-mentioned invention, the encoding unit may delete lower order bits of the sub-band transform factor so that the code has a predetermined fixed length. Accordingly, the image data including the binary image data and the continuous tone image data can be compressed with a high compression rate while a high image quality is maintained. The compression rate is higher than that of the block truncation encoding method.

Additionally, the encoding unit may delete a greater number of lower order bits from the high-frequency component than the low-frequency component when both the maximum value and the minimum value exist in the binary data of the same block data. Accordingly, a change in an average intensity in a block having a sharp gradation change can be prevented, resulting in a prevention of deterioration of the image quality.

Further, the encoding unit may quantize the high-frequency component of the sub-band transform factor by a vector quantizing method.

Additionally, there is provided according to another aspect of the present invention an image processing system comprising:

a dividing unit dividing image data into a plurality of n×m pixel matrix block data, where n and m are integers;

a transform unit transforming each pixel in the n×m pixel matrix block data by a frequency transform method so as to produce a transform factor including a high-frequency component and a low-frequency component;

an image area discriminating unit for determining whether the block being processed corresponds to an edge area or a non-edge area based on the transform factor output from the transform unit;

a quantizing unit quantizing the transform factor for the edge area and the transform factor for the non-edge area by different methods; and an encoding unit encoding an output of the quantizing unit by an entropy encoding method, wherein a total of a number of bits of the high-frequency component and a number of bits of the low-frequency is the same regardless of types of the edge area or the non-edge area, and a number of bits of the high-frequency component for the edge area is the same as a number of bits of the low-frequency component of the non-edge area.

According to the above-mentioned embodiment, image data representing a feature of the original image can be produced while an amount of data is reduced. Additionally, image data corresponding to a plurality of image quality levels can be produced.

In the above-mentioned invention, the encoding unit may also encode error data generated by the quantizing unit. Accordingly, the restored image data can almost completely match the original data.

Additionally, an encoding of the image for the edge area may be performed by using only the high-frequency component, and an encoding of the image for the non-edge area is performed by using only the low-frequency component. According to this invention, the image quality of the restored image may be low, but a feature of the original image can be sufficiently maintained.

Further, in the above-mentioned invention, every other block data may be used for restoring an original image. According to this invention, the image quality of the restored image may be low, but a feature of the original image can be sufficiently maintained while an amount of data is reduced. Thus, a reduced-size image can be easily obtained.

Other objects, features and advantages of the present invention will become more apparent from the following detailed descriptions when read in conjunction with the accompanying drawings.

BRIEF DESCRIPTION OF THE DRAWINGS

FIG. 13 is an illustration for explaining an operation of the image processing system shown in FIG. 12;

FIG. 15 is a block diagram of an image processing system according to a fifth embodiment of the present invention;

FIG. 16 is an illustration for explaining an operation of the image processing system shown in FIG. 15;

FIG. 17A is an illustration for explaining a bit assignment for an edge area in the fifth embodiment;

FIG. 17B is an illustration for explaining a bit assignment for a non-edge area in the fifth embodiment;

FIG. 21 is an illustration for explaining an operation performed by an image processing system according to a seventh embodiment of the present invention;

FIG. 22A is an illustration for explaining a bit assignment for a non-edge area of the seventh embodiment;

FIG. 22B is an illustration for explaining a bit assignment for an edge area of the seventh embodiment;

FIG. 22C is an illustration for explaining discrimination of the non-edge area and the edge-area;

FIG. 22D is an illustration of a vector quantization table used in the seventh embodiment;

FIG. 25 is a block diagram of an image processing system according to a ninth embodiment of the present invention;

FIG. 30A is an illustration of high-frequency components for an edge area; FIG. 30B is an illustration of high-frequency components for a non-edge area; FIG. 30C is an illustration of high-frequency components for an edge area in which two high-frequency components have large values;

DETAILED DESCRIPTION OF THE PREFERRED EMBODIMENTS

A description will now be given, with reference to FIGS. 1 through 6, of a first embodiment of the present invention.

Figure 1:
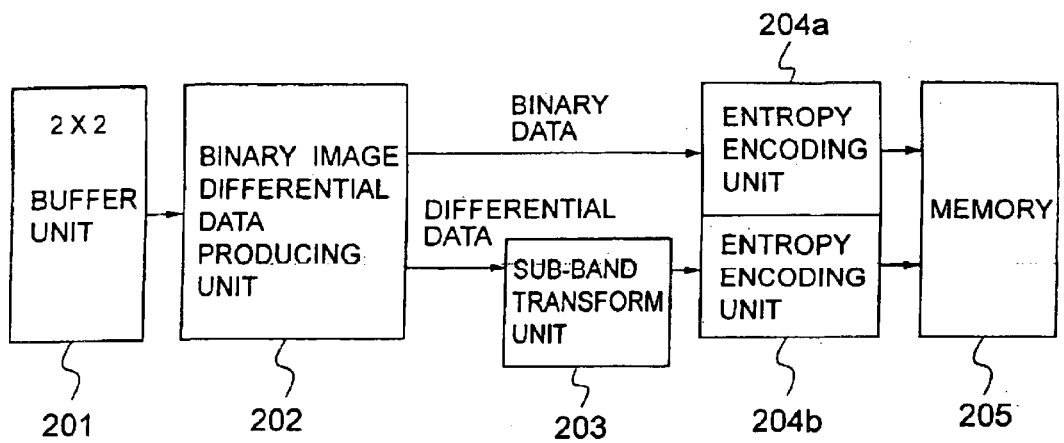
FIG. 1 is a block diagram of an image processing system according to a first embodiment of the present invention.
Figure 2:
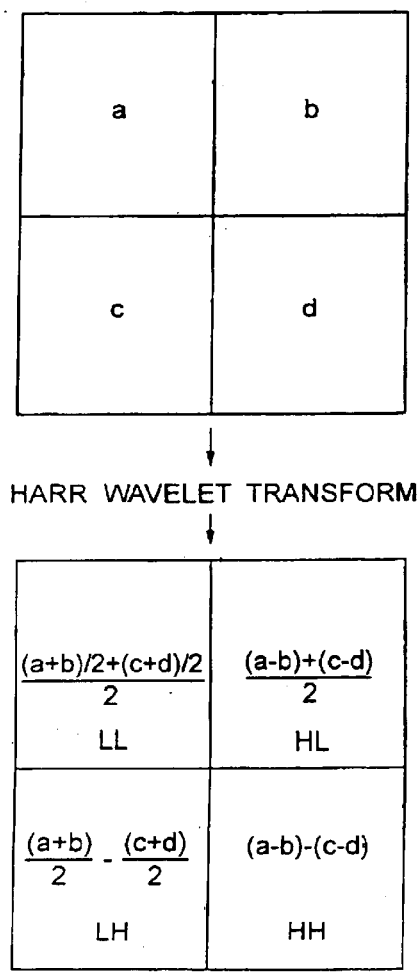
FIG. 2 is an illustration for explaining a sub-band transformation unit shown in FIG. 1.
Figure 3:
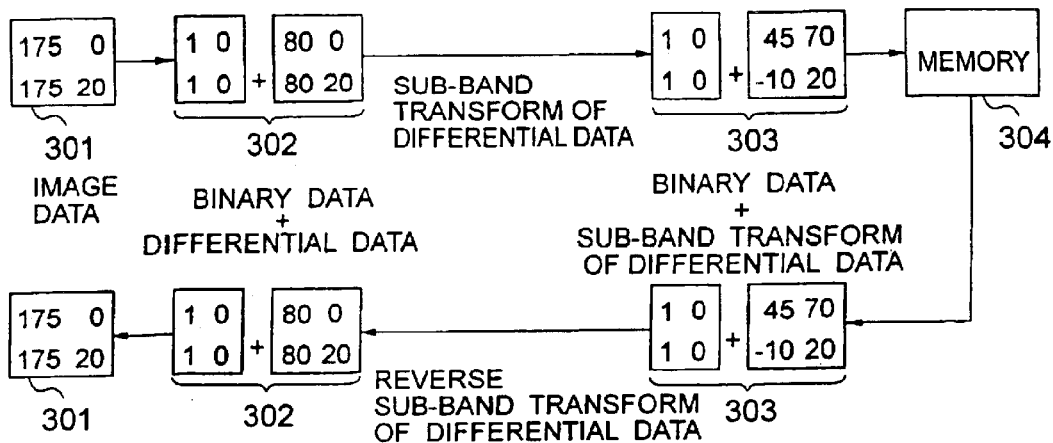
FIG. 3 is an illustration for explaining a compressing and expanding operation performed by the image processing system shown in FIG. 1.
Figure 4A:
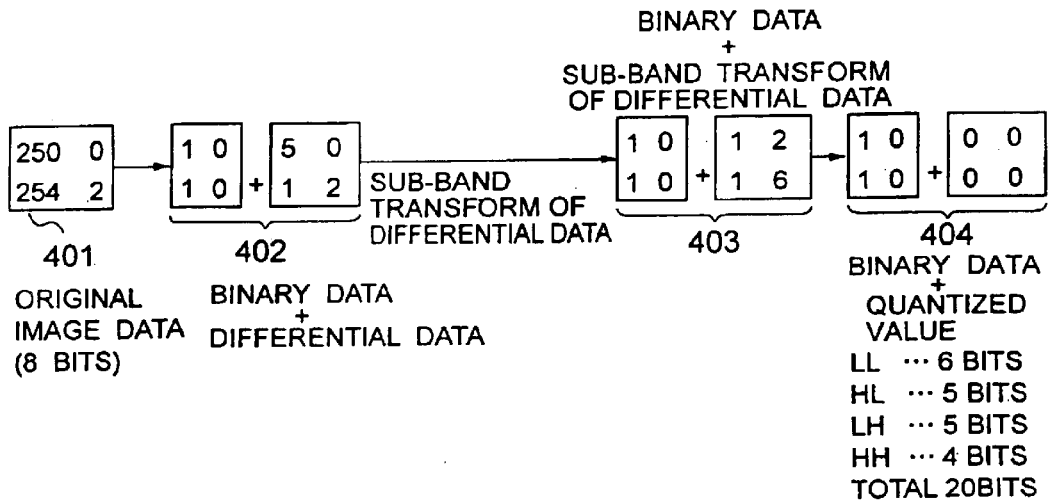
FIG. 4A is an illustration for explaining a compressing operation performed by the image processing system shown in FIG. 1 when a complete binary image fluctuates.
Figure 4B:
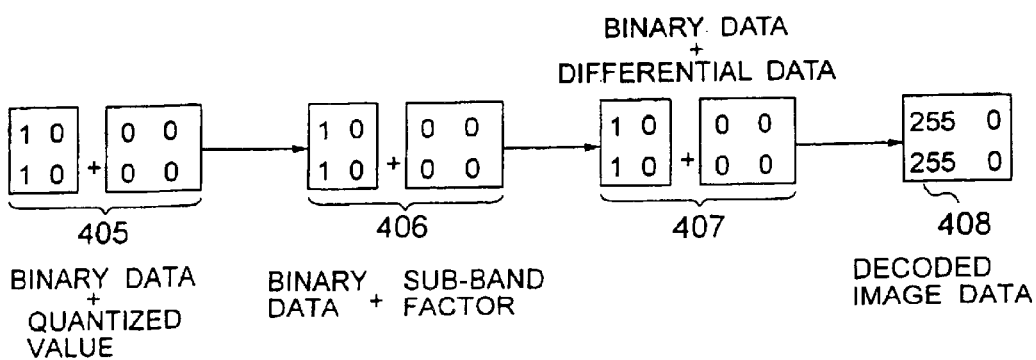
FIG. 4B is an illustration for explaining an expanding operation for data obtained by the compressing operation of FIG. 4A.
Figure 5:
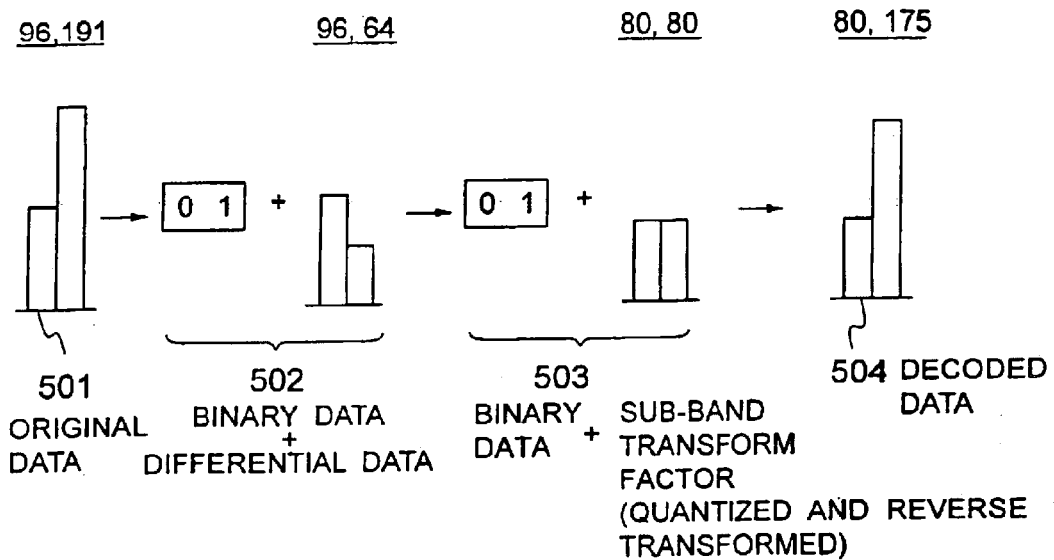
FIG. 5 is an illustration for explaining an operation performed by the image processing system shown in FIG. 1 for deleting lower order bits.
Figure 6:
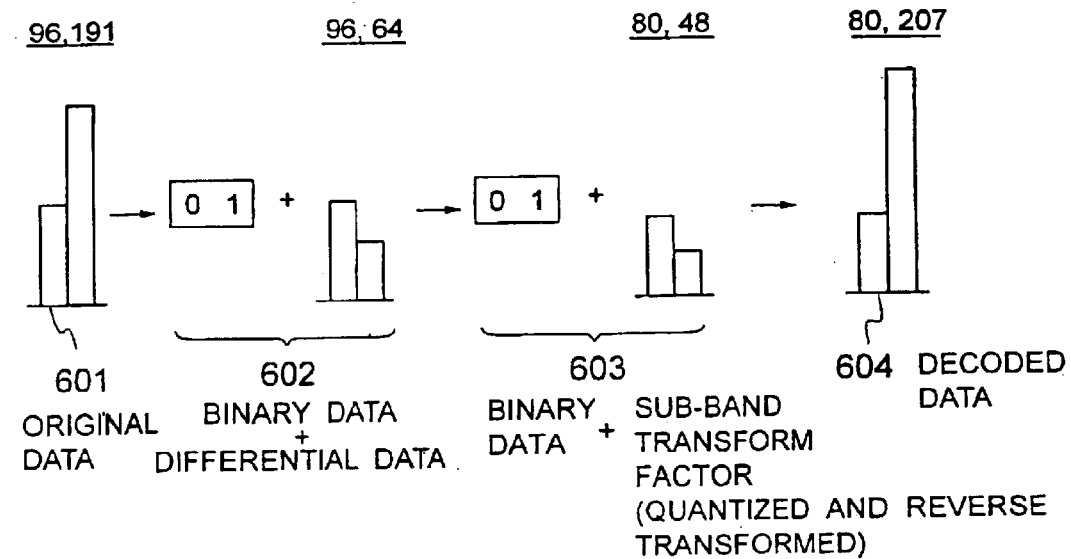
FIG. 6 is an illustration for explaining an operation performed by the image processing system shown in FIG. 1 for deleting lower order bits.

FIG. 1 is a block diagram of an image processing system according to the first embodiment of the present invention. FIG. 2 is an illustration for explaining a sub-band transformation unit shown in FIG. 1. FIG. 3 is an illustration for explaining a compressing and expanding operation performed by the image processing system shown in FIG. 1. FIGS. 4A and 4B are illustrations for explaining a compressing and expanding operation performed by the image processing system shown in FIG. 1 when a complete binary image fluctuates. FIGS. 5 and 6 are illustrations for explaining an operation performed by the image processing system shown in FIG. 1 for deleting lower order bits.

The image processing system according to the first embodiment is applied to a printer using 8-bit data (256 gradation levels) for representing image data. The image processing system shown in FIG. 1 comprises a buffer unit 201, a binary image differential data producing unit 202, a sub-band transformation unit 203, entropy-encoding units 204a and 204b and a memory 205.

The buffer unit 201 extracts 2×2 matrix pixels from image data, and stores the 2×2 matrix pixel data therein. The 2×2 matrix pixel data stored in the buffer unit 201 is transformed into binary image data and differential data by the binary image differential data producing unit 202. The binary data in the present embodiment is obtained by transforming the image data having intensity values from "0" through "255" into,one of binary values "255" and "0". That is, the image data having an intensity value equal to or greater than "128" is transformed into the value "255" and the image data having an intensity value smaller than "128" is transformed into the value "0". It should be noted that the binary values "255" and "0" are represented by values "1" and "0", respectively.

The differential data represents an absolute value of a difference between the original image data and one of the binary values "255" and "0". The data having an intensity value equal to or greater than "128" is calculated by the following equation.

(differential data)=(binary data "255")−(intensity value)

The data having an intensity value smaller than "128" is calculated by the following equation.

(differential data)=(intensity value)−(binary data "0")

When a reverse transformation is performed, the data having an intensity value equal to or greater than "128" is calculated by the following equation.

(reverse transform value)=(binary data "255")−(differential value)

The data having an,intensity value smaller than "128" is calculated by the following equation.

(reverse transform value)=(differential value)−(binary data "0")

The binary data "255" and "0" are then encoded by using an entropy encoding by the entropy-encoding unit 104a. The encoded data is stored in the memory 205. On the other hand, the differential data is transformed by using a sub-band transform method such as the Harr Wavelet transform method by the sub-band transform unit 203. Then, the transformed data is encoded by using the entropy-encoding by the entropy encoding unit 204b. The encoded differential data is also stored in the memory 205.

In this embodiment, the sub-band transform unit 203 transforms the differential data of pixels a through d shown in FIG. 2 by using the Harr Wavelet transform method so as to obtain a low frequency component LL and high-frequency components HL, LH and HH as shown in FIG. 2. At this time, decimals are omitted.

$$LL=\{(a+b)/2+(c+d)/2\}/2$$

$$HL=\{(a-b)+(c-d)\}/2$$

$$LH=\{(a+b)-(c+d)\}/2$$

$$HH=(a-b)-(c-d) \quad (1)$$

The differential data between the original image data and one of the binary data "255" and "0", takes a value from "0" to "127". The LL component is represented by 7-bit data since it takes a value from "0" to "127". Each of the HL component and the LH component is represented by 8-bit data since it takes a value from "−127" to "127". The HH component is represented by 9-bit data since it takes a value from "−255" to "255". When the reverse sub-band transform is performed, the original image data of the pixels a through d are restored by using the LL, HL, LH, HH components and the above equations (1).

A description will now be given, with reference to FIG. 3, of an example of a process performed by the image processing system shown in FIG. 1. It is assumed that original image data 301 including the pixels a through d is input to the image processing system, and the pixels a through d have the following intensity values.

$$a=175$$

$$b=0$$

$$c=175$$

$$d=20$$

In this case, the binary data of the pixels a through d are represented as follows.

$$a=255="1"$$

$$b=0="0"$$

$$c=255="1"$$

$$d=0="0"$$

Additionally, the differential data 302 of the pixels a through d is represented as follows.

$$a=255-175=80$$

$$b=0-0=0$$

$$c=255-175=80$$

$$d=20-0=20$$

The differential data 302 is transformed by the sub-band transform method, and the following data 303 is obtained.

$$LL=45$$

$$HL=70$$

$$LH=-10$$

$$HH=20$$

The data 303 is temporarily stored in a memory 304. The data 303 is read to obtain the original differential data 302 by performing a reverse sub-band transform based on the equations (1). Additionally, the differential data 302 can be calculated based on the binary data "0" and "1".

$$a=255-80=175$$

$$b=0-0=0$$

$$c=255-80=175$$

$$d=20-0=20$$

Accordingly, the original data is restored.

When a continuous tone image is compressed, an amount of information of binary data after compression or an amount of information of sub-band transform factors after compression is negligibly small. This is because the binary data of the continuous tone image is a simple binary image, and it can be compressed into very small amount. Additionally, the differential data (sub-band transform factors after compression) is close to "0".

A description will now be given of a case of a digital copy machine in which image data corresponding to a single page is compressed based on a fixed-length compression method, and is stored in a memory (hereinafter referred to as a page memory) for processing and editing (90-degree rotation) the image. With respect to a quantization, as shown in FIGS. 4A and 4B, the LL component is represented by a multiple of "4": each of the HL and LH components is represented by a multiple of "16"; and the HH component is represented by a multiple of "64". That is, when the quantization is performed, the LL component is divided by "4" (two lower order bits are deleted); each of the HL and LH components is divided by "16" (four lower order bits are omitted); and the HH component is divided by "64" (six lower order bits are deleted). According to the above-mentioned quantization, the LL component (0 to 255) can be represented by 6-bit data; each of the HL and LH components (−255 to 255) can be represented by 5-bit data; and the HH component (−510 to 510) can be represented by 4-bit data. The total number of the data bits is 20 bits.

When the copy machine scans an original image, complete binary image data cannot be obtained due to fluctuation in an intensity of the image, the complete binary image data comprising only the minimum values "0" and the maximum values "255". FIGS. 4A and 4B shows a process for compressing and expanding original image data 401 which is not the complete binary image data as follows.

$$a=250 \neq 255$$

$$b=0$$

$$c=254 \neq 255$$

$$d=2 \neq 0$$

Binary data 402 is obtained based on the threshold value "128" as follows.

$$a=255="1"$$

$$b=0="0"$$

$$c=255="1"$$

$$d=0="0"$$

Additionally, differential data 403 becomes as follows.

$$a=255-250=5$$

$$b=0-0=0$$

$$c=255-254=1$$

$$d=2-0=2$$

The restored data 408 shown in FIG. 4B is complete binary image data since the differential data 402 is quantized after being subjected to the sub-band transformation. That is, the quantization is performed so that the LL component of the differential data becomes 6-bit data, each of the HL and LH components of the differential data becomes 5-bit data and the HH component of the differential data becomes 4-bit data. According to such a quantization method, a fixed length encoding can be achieved with a reduced amount of encoded information. Thus, the binary image data can be corrected to complete binary image data by eliminating a fluctuation generated when the original image is scanned. Additionally, when the thus quantized data is encoded by an entropy encoding method, the—quantized data can be compressed at a high compression rate since each of the sub-band transformation factors LL, HL, LH and HH is "0". Thus, a compression rate, which is almost equal to a compression rate when an image is simply binarized, can be achieved.

A description will now be given, with reference to FIGS. 5 and 6, of a case in which an image having deterioration is compressed, the deterioration of the image being peculiar to an image having a block in which gradation is sharply changed. For the sake of simplification, it is assumed that a one-dimensional transformation is used so as to transform original data 501 (x0, x1)=(96, 191) as follows.

(1) The original data 501 is binarized based on the threshold value "128"→(0, 255);

(2) Differential data 502 between the original image data and one of the binary data "255" and "0" is obtained. →96−0=96, 255−191=64

Then, the obtained differential data 502 is transformed by the Harr Wavelet transform method. →L=(96+64)/2=80, H=64−96=−32

(3) The data L and H are quantized (lower order bits are deleted).

Since the low-frequency component L is more important than the high-frequency component H, the high-frequency component H is quantized roughly (more number of lower order bits are deleted) while the low-frequency component L is quantized finely (less number of lower order bits are deleted). If the low-frequency component L is not quantized and the high-frequency component H is quantized by a multiple of "64", the low-frequency component L and the high-frequency component H become as follows.

$$L=80, H=0$$

The thus obtained L and H are restored to the differential data 503 by a reverse sub-band transformation. Then, the decoded data 504 is restored from the differential data 503. That is, as shown in FIG. 5, the decoded data 504 is changed from (96, 191) to (80, 175). That is, the intensities of both pixel values in the decoded data 504 are decreased from those of the original pixel values. This phenomenon is generated when a pixel which is rendered to be the value "255" and a pixel which is rendered to be the value "0" are present in the same pixel block. This phenomenon is also generated in a two-dimensional pixel block. Thus, there is a problem in that there is a considerable difference between an original image and a restored image.

In order to eliminate the above-mentioned problem, in the present invention, when both a pixel rendered to be the value "255" and a pixel rendered to be the value "0" are present in the same pixel block, the high-frequency components are quantized finely (less number of lower order bits are deleted). Referring to FIG. 6, pixel data 601 (96, 191) is transformed into data 602 including binary data and differential data (96, 64). The differential data (96, 64) is transformed by the Harr Wavelet transform method, and factors L=80 and H=−32 are obtained.

When the factors are quantized, the high-frequency component H is quantized finely, and the low-frequency component L is quantized coarsely. For example, when the high-frequency component H is quantized by a multiple of 64, and the low-frequency component L is quantized by a multiple of 32, the sub-band factors becomes as follows.

$$L=64, H=-32$$

These factors are subjected to a reverse sub-band transformation so as to obtain differential data 603. Then, pixel data 604 is obtained from the thus-obtained differential data 603. As shown in FIG. 6, the pixel data 604 is changed from the original data (96, 191) to (80, 207), but the sum of the two pixel values is not changed. Accordingly, a relative intensity of the pixels is not changed.

Generally, in a pixel block having two binary values, an intensity of an entire pixel block does not change whereas the intensity is changed when the high-frequency components are deteriorated. Accordingly, a change in color over an entire image can be prevented by finely quantizing the high-frequency components H.

A description will now be given of a second embodiment of the present invention. In the second embodiment, the high-frequency components are not sampled on each individual component basis but a sampling operation is performed on a combination of the high-frequency components so as to achieve an efficient sampling operation. An image block having the HL component representing a vertical edge and the LH component representing a horizontal edge being a large value rarely appears in an image. If an image block has one of the HL and the LH components being a large value and the other one of the HL and LH components being a small value and also the HH component being a small value, such an image block corresponds to either a vertical line or horizontal line in the image. Thus, such an image block frequently appears in an image. Additionally, if an image block has the high-frequency components HL, LH and HH all of which are small values, such an image block corresponds to an image area having a uniform intensity or an image area having a gentle change in intensity. Thus, such a block frequently, appears in an image. Accordingly, the image data can be efficiently quantized by appropriately assigning codes to a combination of the high-frequency components. This quantization is referred to as a vector quantization.

Figures 7, 8:
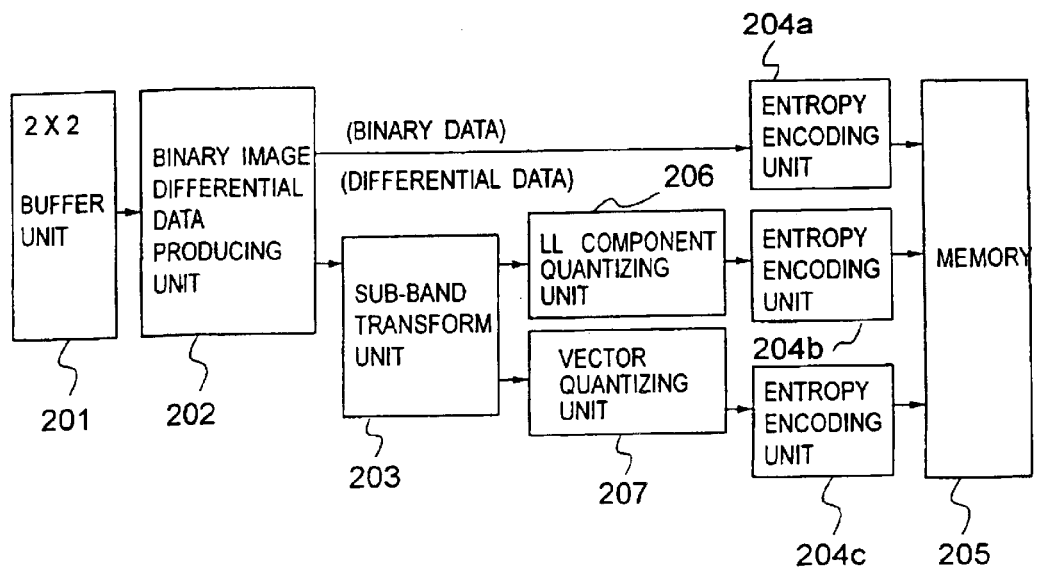
FIG. 7 is an illustration of a quantization table.
FIG. 8 is a block diagram of an image processing system according to a second embodiment of the present invention.

FIG. 7 is a table showing a code assignment to various combinations of the high-frequency components HL, LH and HH which frequently appear in an image. Codes "0" through "15" are assigned to the combinations of the high-frequency components HL, LH and HH. According to this method, each of the high-frequency components HL and LH can be compressed into 4-bit data. In the quantizing method, a difference P between the transformation factor and each value of the vector quantization is obtained for each individual component, and a quantization code which minimizes the difference P is used.

$$P=|HL-HLqi|+|LH-LHqi|+|HH-HHqi|$$

Where HLqi, LHqi and HHqi are quantization values corresponding to a code value i in the quantization table shown in FIG. 7.

Figure 9:
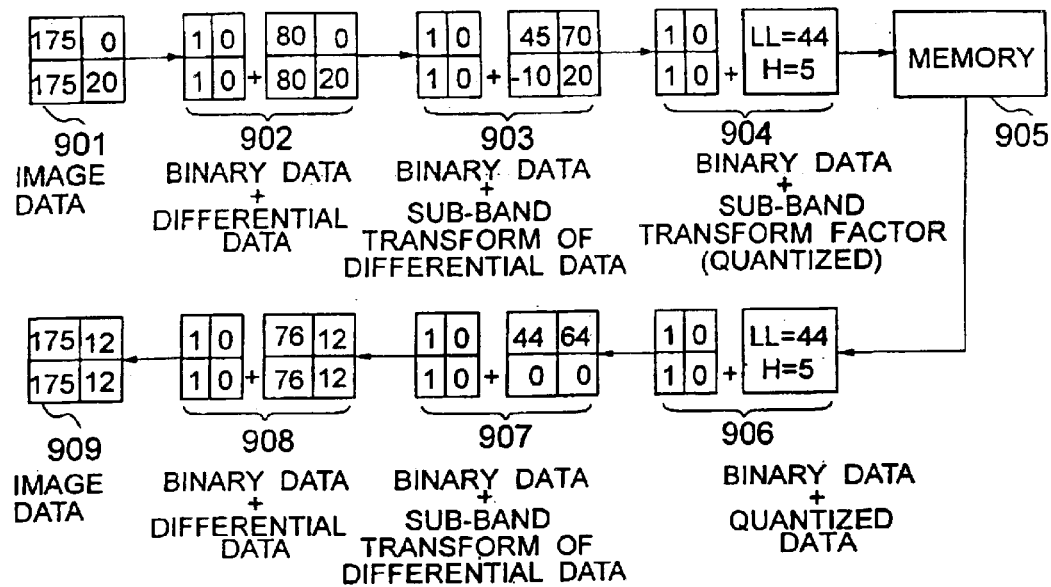
FIG. 9 is an illustration for explaining a transformation of image data performed by the image processing system shown in FIG. 8

FIG. 8 is a block diagram of an image processing system according to the second embodiment of the present invention. FIG. 9 is an illustration for explaining a transformation of image data performed by the image processing system shown in FIG. 8

As shown in FIG. 8, the image processing system according to the second embodiment of the present invention has the same structure as the image processing system according to the first embodiment except for a low-frequency component quantizing unit 206 and a high-frequency component quantizing unit 207 being added between the sub-band transform unit 203 and the entropy encoding units 204b and 204c.

The 2×2 matrix pixel data extracted and stored in the buffer unit 201 is transformed into binary image data and differential data by the binary image differential data producing unit 202. Then, the binary data is encoded by the entropy encoding unit 204a by using the entropy encoding method. The encoded data is stored in the memory 205. The differential data is transformed by the sub-band transform unit 203 by using the Harr Wavelet transformation method. The low-frequency component LL of the transformed data is quantized by the low-frequency component quantizing unit 206, and then the quantized data is encoded by the entropy encoding unit 204b. The encoded data is stored in the memory 205. The high-frequency components HL, LH and HH of the transformed data are quantized by the high-frequency component quantizing unit 207, and then the quantized data is encoded by the entropy encoding unit 204c. The encoded data is stored in the memory 205.

In FIG. 9, image data 901 which is the same as that shown in FIG. 3 is compressed and enlarged.

$a=175$ $b=0$ $c=175$ $d=20$

The binary data 902 is obtained based on the threshold value "128" as follows.

$a=255=$"1"

$b=0=$"0"

$c=255=$"1"

$d=0=$"0"

The differential data 902 becomes as follows.

$a=255-175=80$ $b=0-0=0$ $c=255-175=70$ $d=20-0=0$

The differential data 902 is subjected to a sub-band transform using the equation (1), and the following data 903 is obtained as a result.

$LL=45$ $HL=70$ $LH=-10$ $HH=20$

The LL component is subjected to a linear quantization using quantization representing values which are multiples of "4", and the following result is obtained.

$LL=44$

As for the high frequency components HL, LH and HH, the following combination which is closest to the combination (HL, LH, HH)=(70, −10, 20) is selected from the quantizaiton table shown in FIG. 7.

$(HL, LH, HH)=(64, 0, 0)$

The corresponding code 5 in the quantization table is set to the vector quantization value H (H=5).

When an encoding operation is performed, differential data 908 restored based on factors 907 which are (LL, HL, LH, HH)=(44, 64, 0, 0) becomes as follows.

$a=76$ $b=12$ $c=76$ $d=12$

Finally, image data 909 is obtained from the differential data 908 based on the binary data a=255, b=0, c=255 and d=12 as follows.

$a=255-76=179$ $b=12-0=12$ $c=155-76=179$ $d=12-0=12$

As mentioned above, according to the second embodiment of the present invention, the high-frequency components can be represented by 4-bit data in total since the high-frequency components are quantized by the vector quantizing method. Additionally, the LL component becomes 5-bit data by quantizing the original 7-bit data using a multiple of 4. Further, the binary image data can be represented by 4-bit data. Thus, the entire factor corresponding to the 2×2 pixel block can be represented by 13-bit data. Thus, a fixed length encoding method, which is more efficient than a method which does not use the vector quantization, can be achieved.

Figure 10:
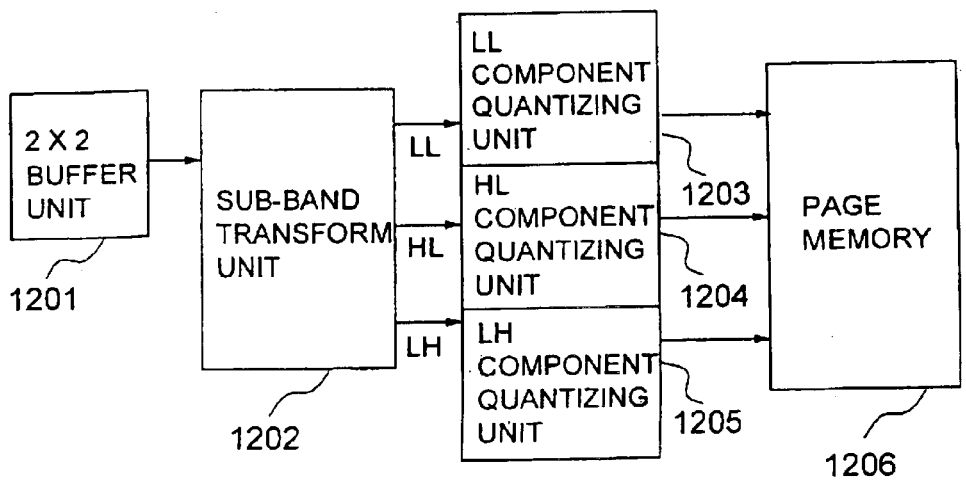
FIG. 10 is a block diagram of an image processing system according to a third embodiment of the present invention.
Figure 11:
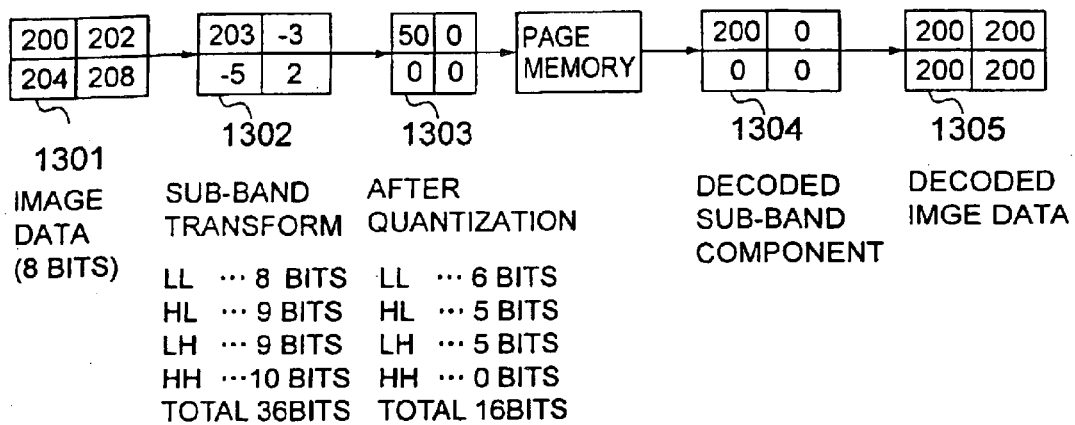
FIG. 11 is an illustration for explaining a compressing and expanding operation performed by the image processing system shown in FIG. 10.

A description will now be given, with reference to FIGS. 10 and 11, of a third embodiment of the present invention. FIG. 10 is a block diagram of an image processing system according to the third embodiment of the present invention. FIG. 11 is an illustration for explaining a compressing and expanding operation performed by the image processing system shown in FIG. 10. In FIG. 10, a sub-band transform unit 1202 transforms the image data corresponding to the pixels a through d received from a 2×2 buffer unit 1201 by using the Harr Wavelet transform method so as to obtain the low-frequency component LL and the high-frequency components HL, LH and HH. At his time, decimals are omitted. When a reverse sub-band transform is performed, the original image data corresponding to the pixels a through d is restored based on the components LL, HL, LH and HH and the equations (1).

The LL component takes a value from "0" to "255", and is represented by 8-bit data. Each of the HL and LH components takes a value from "−255" to "255", and is represented by 9-bit data. The HH component takes a value from "−510" to "510", and is represented by 10-bit data. Thus, the total number of bits is 36. The importance of each of the sub-band transformation factors LL, HL, LH and HH is different, and a large part of lower order bits of the high-frequency components HL, LH and HH can be deleted.

Accordingly, in this embodiment, a LL component quantizing unit 1203 quantizes the LL component into a multiple of 4. An HL component quantizing unit 1204 quantizes the HL component into a multiple of 16. An LH component quantizing unit 1205 quantizes the LH component into a multiple of 16. The HH component is rendered to be "0" that is the HH component is discarded. Specifically, the LL component is transformed from 8-bit data to 6-bit data by being divided by 4. Each of the HL and LH components is transformed from 9-bit data to 5-bit data by being divided by 16. The HH component is transformed from 10-bit data to 0 by being discarded. Accordingly, the total number of bits of the factors of the 2×2 pixel block is reduced from 36 to 16. The quantized values obtained by the quantizing units are stored in a page memory 1206.

A description will now be given, with reference to FIG. 11, of a specific operation of the image processing system shown in FIG. 10.

It is assumed that the following image data 1301 corresponding to the pixels a through d shown in FIG. 2 is input to the sub-band transform unit 1202.

a=200 b=202 c=204 d=208

The image data is transformed by the Harr Wavelet transform method and the following factors 1302 are obtained.

LL=203

$HL$=−3

$LH$=−5

HH=2

Lower order bits of the factors 1302 are deleted, and the following quantization data 1303 is obtained.

LL=50

HL=0

LH=0

HH=0

The following quantization data 1303 is stored in the page memory 1206, and then two 0-bits are added so as to obtain the following factors 1304.

LL=200

HL=0

LH=0

HH=0

Thereafter, the factors 1304 are transformed by the reverse Harr Wavelet transform method so as to restore the following image data 1305.

a=200 b=200 c=200 d=200

Accordingly, despite of the number of bits being greatly reduced, the restored image data 1305 is almost equal to the original image data 1301. Additionally, the fixed length encoding using the sub-band transform can be performed by simple calculations such as addition and subtraction in the equations (1) and a bit shift. Additionally, a good image quality can be obtained by the fixed-length encoding according to the present embodiment.

Figure 12:
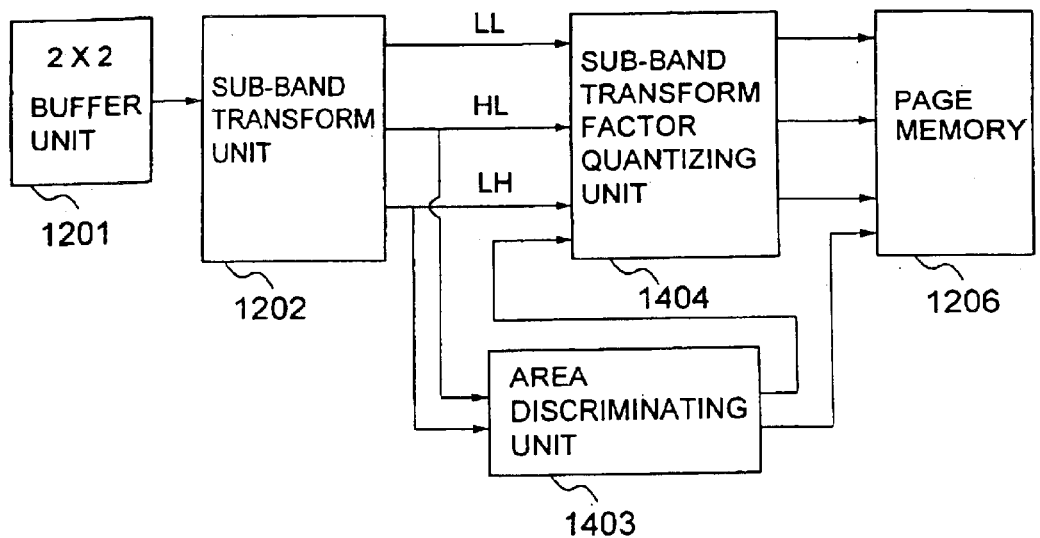
FIG. 12 is a block diagram of an image processing system according to a fourth embodiment of the present invention.

A description will now be given, with reference to FIGS. 12 to 14, of a fourth embodiment of the present invention. FIG. 12 is a block diagram of an image processing system according to the present invention. The image processing system according to the fourth embodiment of the present invention comprises the 2×2 buffer unit 1201, the sub-band transform unit 1202 and the page memory 1206. The image processing unit shown in FIG. 12 further comprises an area discriminating unit 1403 and a sub-band transform factor quantizing and encoding unit 1404. The area discriminating unit 1403 classifies areas of the image into one of an edge area having a sharp gradation change and a non-edge area other than the edge area based on the factors HL and LH which are transformed by the sub-band transform unit 1202. Specifically, the area discriminating unit 1403 determines that an area to be processed is an edge area if an absolute value of one of the HL and LH components is equal to or greater than a threshold value "64". The area discriminating unit 1403 determines that the area to be processed is the non-edge area if an absolute value of one of the HL and LH components is less than the threshold value "64". If the area to be processed is determined to be the edge area, the area discriminating unit 1403 supplies a value "1" as a flag value to the sub-band transform factor quantizing and encoding unit 1404 and the page memory 1206. If the area to be processed is determined to be the non-edge area, the area discriminating unit 1403 supplies a value "0" as a flag value to the sub-band transform factor quantizing and encoding unit 1404 and the page memory 1206.

The sub-band transform factor quantizing and encoding unit 1404 quantizes the LL component of the edge area by a multiple of 4 (divide by 4) so as to change the LL component from 8-bit data to 6-bit data. Additionally, the sub-band transform factor quantizing and encoding unit 1404 quantizes each of the HL and LH components by a multiple of 64 (divide by 64) so as to change each of the HL and LH components from 9-bit data to 3-bit data. With respect to the non-edge area, the sub-band transform factor quantizing and encoding unit 1404 quantizes the LL component by a multiple of 4 (divide by 4) so as to change the LL component from 8-bit data to 6-bit data. Additionally, the sub-band transform factor quantizing and encoding unit 1404 quantizes each of the HL and LH components by rendering an absolute value of each of the HL and LH components to become one of values 0, 16, 32 and 48 so as to change the HL and LH components from 9-bit data to 3-bit data. Additionally, the HH component of either the edge area or the non-edge area is discarded so as to change the HH component from 10-bit data to 0.

Figure 14A:
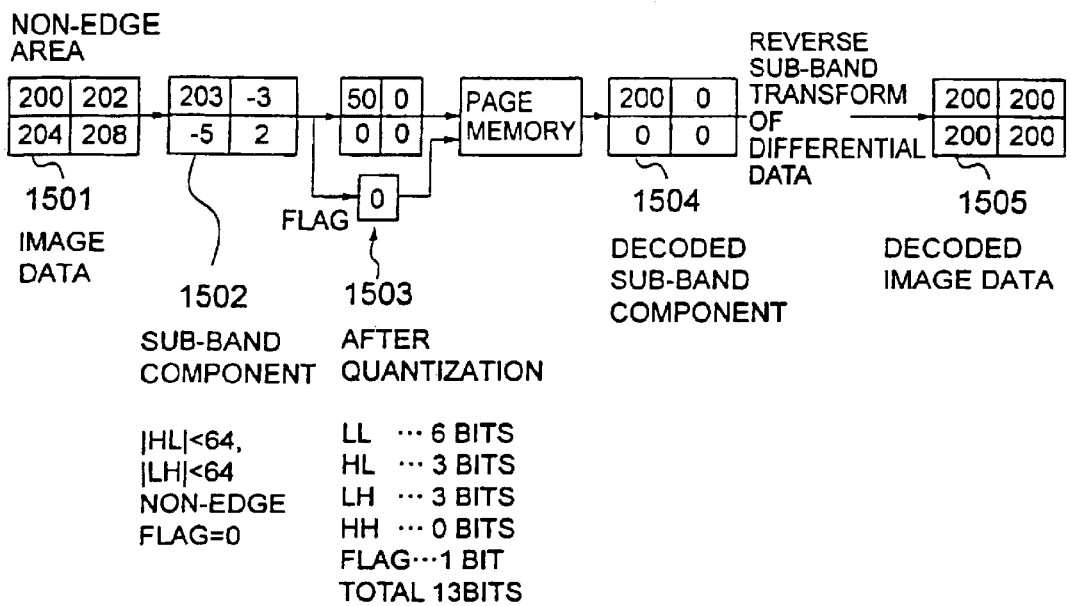
FIG. 14A is an illustration for explaining a compressing and expanding operation for a non-edge area performed by the image processing system shown in FIG. 12.

A description will now be given, with reference to FIGS. 14A and 14B, of a specific example of an operation of the image processing system shown in FIG. 12. FIG. 14A shows a case in which the following image data 1501 which is extracted from a non-edge area is processed.

a=200 b=202 c=204 d=208

The image data 1501 is subjected to the Harr Wavelet transform, and the following factors 1502 are obtained.

LL=203

$HL$=−3

$LH$=−5

HH=2

Since absolute values of both the HL and LH components are less than the threshold value "64", the pixel block is determined as the non-edge area. Accordingly, the LL component is quantized by a multiple of 4 and the HL and LH components are divided by 16 and the HH component is discarded, which results as follows LL=50 (6 bits).

HL=0 (3 bits)

LH=0 (3 bits).

HH=0 (0 bit)

Flag=0 (1 bit)

Total=13 bits

The quantized data 1503 is stored in the page memory 1206, and then 0-bits are added to obtain the following factors 1504. The number of added 0-bits corresponds to the number of the previously deleted bits.

LL=200

HL=0

LH=0

HH=0

Thereafter, the factors 1504 are subjected to the reverse Harr Wavelet transform so as to obtain decoded image data 1505 as follows.

a=200 b=200 c=200 d=200

It should be appreciated that the decoded image data is roughly equal to the original image data 1501.

Figure 14B:
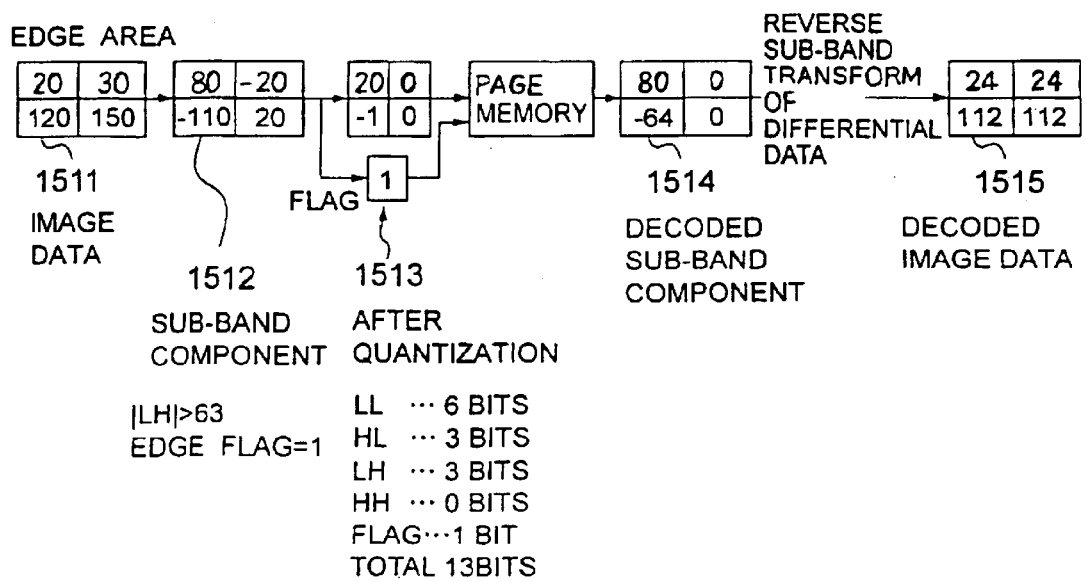
FIG. 14B is an illustration for explaining a compressing and expanding operation for an edge area performed by the image processing system shown in FIG. 12.

FIG. 14B shows a case in which the following image data 1511 that is extracted from an edge area is processed.

a=20 b=30 c=120 d=150

The image data 1511 is subjected to the Harr Wavelet transform, and the following factors 1512 are obtained.

LL=80

$HL$=-20

$LH$=-110

HH=20

Since the absolute value of the LH component is not less than the threshold value "64", the pixel block is determined as the edge area. Accordingly, the LL component is quantized by a multiple of 4 and the HL and LH components are quantized by a multiple of 64 and the HH component is discarded, which produces results as follows.

LL=20 (6 bits)

HL=0 (3 bits)

$LH$=-1 (3 bits)

HH=0 (0 bit)

Flag=1 (1 bit)

Total=13 bits

The quantized data 1513 is stored in the page memory 1206, and then 0-bits are added to obtain the following factors 1514. The number of the added 0-bits corresponds to the number of the previously deleted bits.

LL=80

HL=0

$LH$=-64

HH=0

Thereafter, the factors 1514 are subjected to the Harr Wavelet transform so as to obtain decoded image data 1515 as follows.

a=24 b=24 c=112 d=112

It should be appreciated that the decoded image data 1515 still represents an edge area despite of, a large number of bits being deleted.

In the third embodiment, the HL and LH components are quantized by a multiple of 16 irrespective of whether the pixel block to be processed corresponds to the edge area or the non-edge area. However, in the fourth embodiment, the HL and LH components are quantized by a multiple of 64 when the absolute values of the HL and LH components are equal to or greater than the threshold value "64". Thus, the quantization representative values such as "96" or "106" are eliminated. Thus, the number of bits of the quantized data in the fourth embodiment is less than that of the third embodiment. However, in the edge area in which a gradation change is sharp, recognizable deterioration in the image is rarely generated when the values of the high-frequency components are coarsely sampled. Thus, the information regarding the high-frequency components can be deleted while the image quality is maintained at a certain level. Thus, the fixed-length encoding can be achieved by the above-mentioned separation of an image area.

A description will now be given, with reference to FIGS. 15 to 18, of a fifth embodiment of the present invention. The fifth embodiment has the same structure as that of the fourth embodiment except for the area discriminating unit 1403 and the sub-band transform factor quantization an encoding unit 1404 being replaced by an area discriminating unit 1403a and a sub-band transform factor quantizing and encoding unit 1404a. The area discriminating area 1403a classifies areas of the image into one of an edge area having a sharp gradation change and a non-edge area other than the edge area based on the factors HL and LH which are transformed by the sub-band transform unit 1202. Specifically, the area discriminating unit 1403a determines that an area to be processed is an edge area if an absolute value of one of the HL and LH components is equal to or greater than a threshold value "16". Otherwise, the area discriminating unit 1403a determines that the area to be processed is the non-edge area if an absolute value of one of the HL and LH components is less than the threshold value "16". If the area to be processed is determined to be the edge area, the area discriminating unit 1403a supplies a value "1" as a flag value to the sub-band transform factor quantizing and encoding unit 1404a and the page memory 1206. If the area to be processed is determined to be the non-edge area, the area discriminating unit 1403a supplies a value "0" as a flag value to the sub-band transform factor quantizing and encoding unit 1404 and the page memory 1206.

The sub-band transform factor quantizing and encoding unit 1404a changes a bit assign ratio used by a fixed-length encoding method in response to the determination as to whether the image area to be processed is the edge area or the non-edge area. For example, for the non-edge area, 6 bits are assigned to the LL component since a gradation is important for visual sense, whereas 3 bits are assigned to each of the HL and LH components. On the other hand, for the edge-area, 4 bits are assigned to the LL component since recognition of an edge is important for visual sense, and 4 bits are assigned to each of the HL and LH components.

That is, for the edge-area, the sub-band transform factor quantizing and encoding unit 1404a quantizes the LL component of the edge area by a multiple of 16 (divide by 16) so as to change the LL component from 8-bit data to 4-bit data. Additionally, the sub-band transform factor quantizing and encoding unit 1404a quantizes each of the HL and LH components by a multiple of 32 (divide by 32) so as to change each of the HL and LH components from 9-bit data to 4-bit data. With respect to the non-edge area, the sub-band transform factor quantizing and encoding unit 1404a quantizes the LL component by a multiple of 4 (divide by 4) so as to change the LL component from 8-bit data to 6-bit data. Additionally, the sub-band transform factor quantizing and encoding unit 1404a quantizes each of the HL and LH components by a multiple of 4 (divide by 4) so as to change the HL and LH components from 9-bit data to 3-bit data. Additionally, the HH component of either the edge area or the non-edge area is discarded so as to change the HH component from 10-bit data to 0.

Figure 18A:
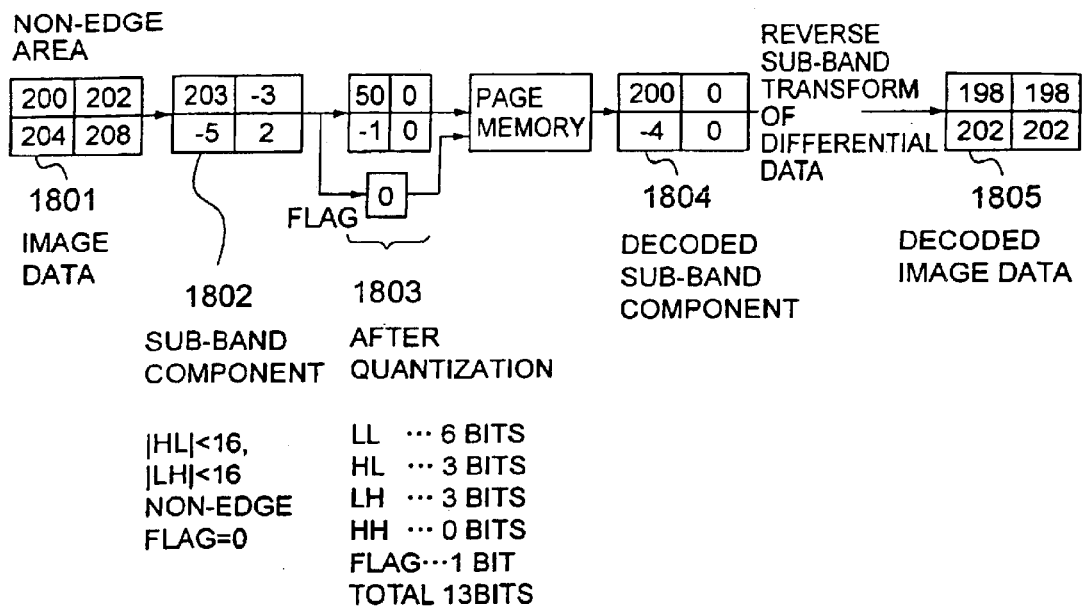
FIG. 18A is an illustration for explaining a compressing and expanding operation for a non-edge area performed by the image processing system according to the fifth embodiment of the present invention.

A description will now be given, with reference to FIGS. 18A and 18B, of a specific example of an operation of the image processing system according to the present embodiment. FIG. 18A shows a case in which the following image data 1801 which is extracted from a non-edge area is processed.

a=200 b=202 c=204 d=208

The image data 1801 is subjected to the Harr Wavelet transform, and the following factors 1802 are obtained.

LL=203

$HL=-3$ $LH=-5$

HH=2

Since absolute values of both the HL and LH components are less than the threshold value "16", the pixel block is determined as the non-edge area. Accordingly, the LL component is quantized by a multiple of 4, the HL and LH components are quantized by a multiple of 4 and the HH component is discarded, which produces results as follows.

LL=50 (6 bits)

HL=0 (3 bits)

LH=0 (3 bits)

HH=0 (0 bit)

Flag=0 (1 bit)

Total=13 bits

The quantized data 1803 is stored in the page memory 1206, and then 0-bits are added to obtain the following factors 1804. The number of added 0-bits corresponds to the number of the previously deleted bits.

LL=200

HL=0

$LH=-4$

HH=0

Thereafter, the factors 1804 are subjected to the reverse Harr Wavelet transform so as to obtain decoded image data 1805 as follows.

a=198 b=198 c=202 d=202

Figure 18B:
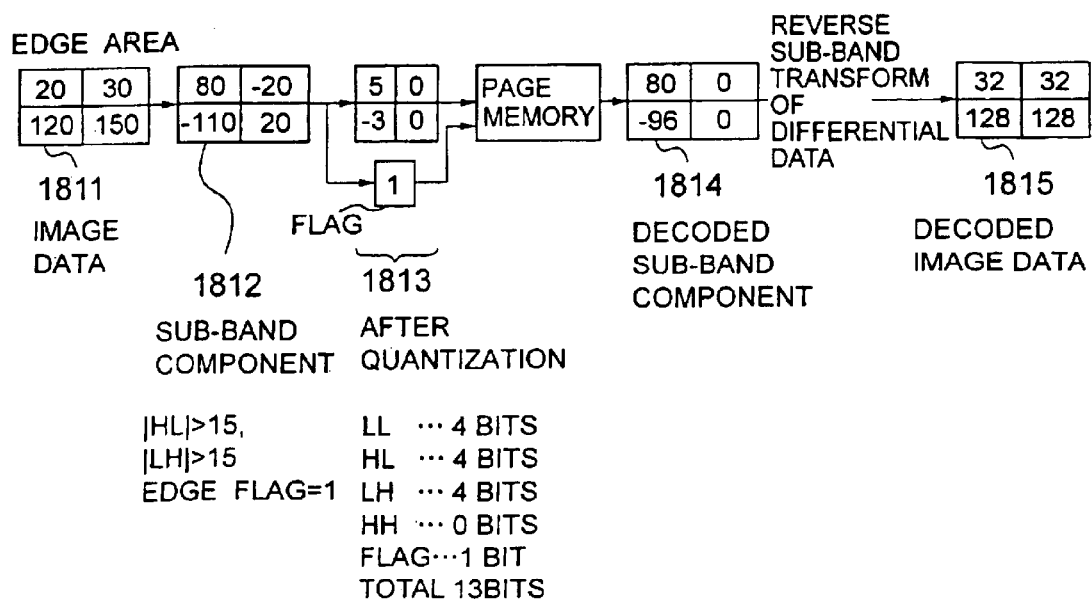
FIG. 18B is an illustration for explaining a compressing and expanding operation for an edge area performed by the image processing system according to the fifth embodiment of the present invention.

FIG. 18B shows a case in which the following image data 1811 which is extracted from an edge area is processed.

a=20 b=30 c=120 d=150

The image data 1811 is subjected to the Harr Wavelet transform, and the following factors 1812 are obtained.

LL=80

$HL=-20$ $LH=-110$

HH=20

Since the absolute value of the LH component is not less than the threshold value "16", the pixel block is determined as the edge area. Accordingly, the LL component is quantized by a multiple of 4, the HL and LH components are quantized by a multiple of 32 and the HH component is discarded, which results as follows LL=5 (4 bits)

HL=0 (4 bits)

$LH=-3$ (4 bits)

HH=0 (0 bit)

Flag=1 (1 bit)

Total=13 bits

The quantized data 1813 is stored in the page memory 1206, and then 0-bits are added to obtain the following factors 1814. The number of the added 0-bits corresponds to the number of the previously deleted bits.

LL=80

HL=0

*LH*=−96

HH=0

Thereafter, the factors 1514 are subjected to the reverse Harr Wavelet transform so as to obtain decoded image data 1515 as follows.

a=32 b=32 c=128 d=128

In the third embodiment, the HL and LH components are quantized by a multiple of 16 irrespective of whether the pixel block to be processed corresponds to the edge area or the non-edge area. However, in the fifth embodiment, the factors are encoded by using different numbers of assigned bits in response to the determination as to whether the image area corresponds to the edge area or the non-edge area. That is, the LL component of the non-edge area in which gradation is important is finely sampled, whereas the HL and LH components of the edge area in which a change in intensity is important are finely sampled. Thus, the fixed-length encoding can be achieved while the feature of an image is maintained.

Figure 19:
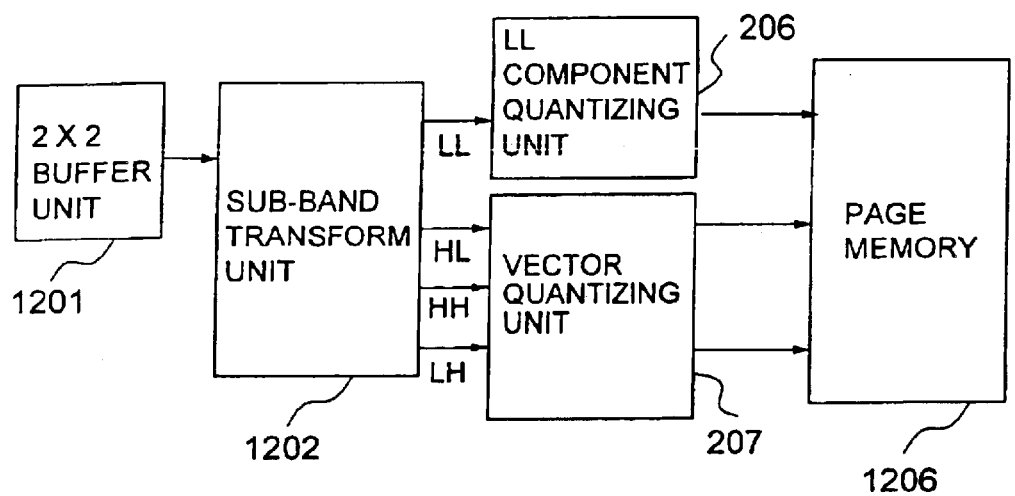
FIG. 19 is a block diagram of an image processing system according to a sixth embodiment of the present invention.
Figure 20:
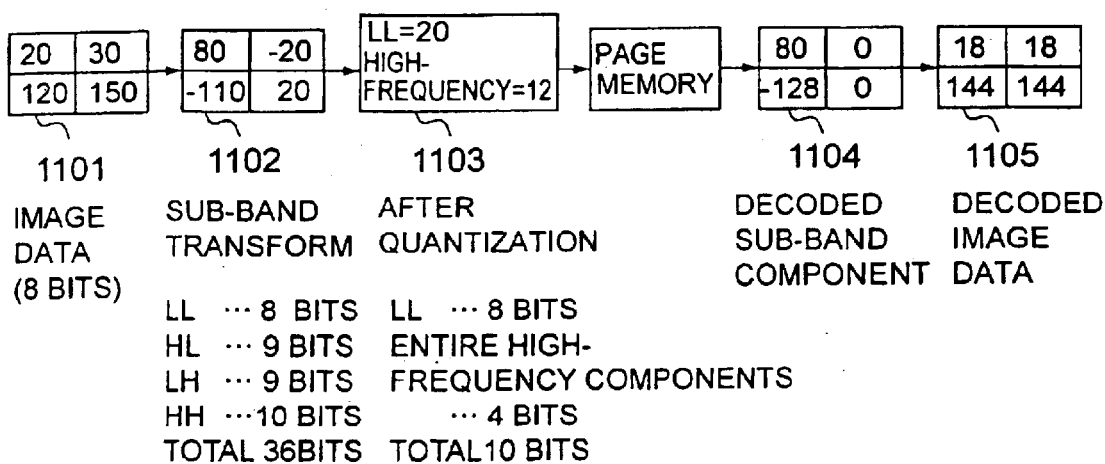
FIG. 20 is an illustration for explaining a compressing and expanding operation performed by the image processing system shown in FIG. 19.

A description will now be given, with reference to FIGS. 19 and 20, of a sixth embodiment of the present invention. FIG. 19 is a block diagram of an image processing system according to the sixth embodiment of the present invention. FIG. 20 is an illustration for explaining a compressing and expanding operation performed by the image processing system shown in FIG. 19.

In the present embodiment, pixel values a through d are subjected to the Harr Wavelet transform by the sub-band transform unit 1202 as shown in FIG. 12. Then, the low-frequency component LL is quantized by the low-frequency quantizing unit 206 shown in FIG. 8, and the high-frequency components HL, LH and HH are vector-quantized by the vector quantizing unit 207 based on the quantization table shown in FIG. 7.

Referring to FIG. 20, the following original image data 1101 is input to the sub-band transform unit 1202.

a=20 b=30 c=120 d=150

The original image data 1101 is subjected to the Harr Wavelet transform, and the following factors 1102 are obtained.

LL=80 (8 bits)

*HL*=−20 (9 bits)

*LH*=−110 (9 bits)

HH=20 (10 bits)

Total 36 bits

The LL component is represented by 6-bit data as follows.

LL=20 (6 bits)

The HL, LH and HH components (−20, −110, 20) are selected from the quantization table shown in FIG. 7. That is, the following values which are closest to the combination of the values (−20, −110, 20) is selected.

(*HL, LH, HH*)=(0, −128, 0)

Then, the corresponding code "12" (4 bits) which represents the quantization representative vector is set as the quantization value. Thus, the original image data 1101 is compressed to the data 1103 having 10 bits as the total number of bits.

In a decoding process, two 0-bits are added to the LL component (LL=20 (6 bits)). Then, the quantized data 1103 is decoded to the data 1104 based on the vector quantization value "12" as follows.

(*LL, HL, LH, HH*)=(80, 0, −128, 0)

Thereafter, the data 1104 is subject to the reverse Harr Wavelet transform, and the following image data 1105 is obtained.

a=16 b=16 c=144 d=144

A description will now be given, with reference to FIGS. 21 to 23, of a seventh embodiment of the present invention. In the seventh embodiment, the bit assignment of the fifth embodiment and the vector quantization of the high-frequency components are combined.

In the present embodiment, similar to the fifth embodiment, it is determined that an area to be processed is an edge area if an absolute value of one of the HL and LH components is equal to or greater than a threshold value "16". On the other hand, it is determined that the area to be processed is the non-edge area if an absolute value of one of the HL and LH components is less than the threshold value "16". If the area to be processed is determined to be the edge area, four higher order bits are assigned to the low-frequency component LL, and four lower order bits are assigned to the high frequency components HL, LH and HH as shown in FIG. 22A. On the other hand, if the area to be processed is the non-edge area, six higher order bits are assigned to the low-frequency component LL and two lower order bits are assigned to the high-frequency components HL, LH and HH as shown in FIG. 22B. Additionally, the two lower order bits are used to indicate flag information as shown in FIG. 22C. That is, the two lower order bits are set to "00" for the non-edge area, and "00" is not set to the two lower order bits for the edge area.

With respect to quantization, as shown in FIG. 22D, the LL component of the edge area is divided by 16 so as to obtain 4-bit data, and the high-frequency components are vector-quantized to be represented by 4-bit data. It should be noted that values 0=0000, 4=0100, 8=1000 and 12=1100 are not used since these values have the two lower order bits "00" which is reserved for the flag information. Additionally, the LL component of the non-edge area is divided by 4 so as to obtain 6-bit data, and only "00" is used for the high-frequency components.

Figure 23A:
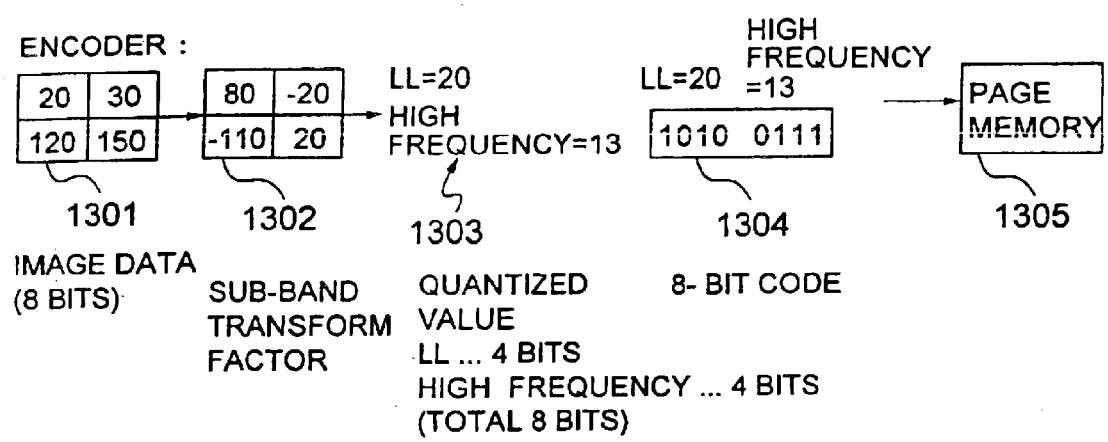
FIG. 23A is an illustration for explaining a compressing operation performed in the seventh embodiment.
Figure 23B:
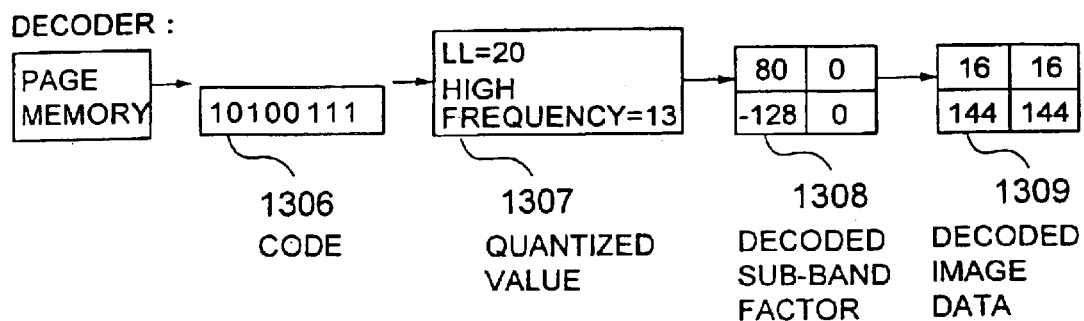
FIG. 23B is an illustration for explaining an enlarging operation performed in the seventh embodiment.

FIG. 23A is an illustration for explaining a compressing operation performed in the seventh embodiment, and FIG.

23B is an illustration for explaining an enlarging operation performed in the seventh embodiment.

It is assumed that the following image data 1301 which is extracted from the edge area is input.

a=20 b=30 c=120 d=150

The image data 1301 is subjected to the Harr Wavelet transform, and the following factors 1302 are obtained

LL=80

$HL$=−20

$LH$=−110

HH=20

Since absolute values of both the HL and LH components are greater than the threshold value "16", the block being processed is determined as the non-edge area. Thus, the LL component is divided by 16 and the result is as follows.

LL=20=1010 (4 bits)

With respect to the high-frequency components, the following combination which is closest to the HL, LH and HH components (−20, −110, 20) is selected.

($HL$, $LH$, $HH$)=(0, −128, 0)

Additionally, the code "13=0111 (4 bits)" representing the quantization representative vector is set to the quantization value 1303. Thus, the quantized data 1304 having a total number of bits being 8 bits is obtained. The quantized data 1304 is stored in the page memory 1206 as data 1305.

When encoding is performed, the data 1305 being processes is read from the page memory 1206 as data 1306. The data 1306 is determined as the non-edge area since the two lower order bits are not "00". Thus, the following factors 1308 are obtained.

LL=80

HL=0

$LH$=−128

HH=0

Thereafter, the factors 1308 are subject to the reverse Harr Wavelet transform, and the following decoded image data 1309 is obtained.

a=16 b=16 c=144 d=144

As mentioned above, according to the seventh embodiment, since there is no need to assign bits for indicating the flag information, the image data can be efficiently encoded when the number of bits used by the fixed length encoding method is limited.

A description will now be given, with reference to FIGS. 24A, 24B, 24C and 24D, of an eighth embodiment of the present invention.

Figure 24A:
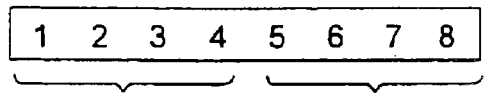
FIG. 24A is an illustration for explaining a bit assignment for,an edge area of-the seventh embodiment.

FIG. 24A is an illustration of 8-bit data corresponding to the edge area obtained in the above-mentioned seventh embodiment. The 8-bit data comprises four higher order bits which represent the LL component and four lower order bits which represent the vector quantization value of the high-frequency components. Generally, since a pixel block having a large intensity change rarely appears in an image, most of the vector quantization values take small values when the quantization table shown in FIG. 22D is used. Accordingly, in many cases, each of the two most significant bits is "0", and each of the two least significant bits is randomly either "1" or "0".

Figure 24B:
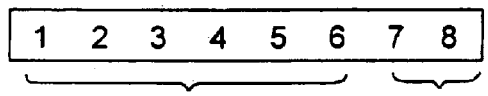
FIG. 24B is an illustration for explaining a bit assignment for a non-edge of the seventh embodiment.
Figure 24C:
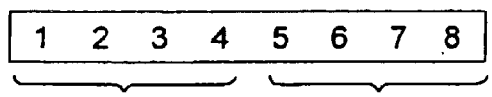
FIG. 24C is an illustration for explaining a bit assignment for an edge area of an eighth embodiment.
Figure 24D:
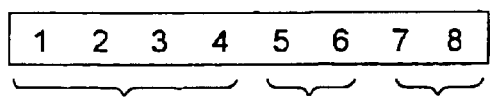
FIG. 24D is an illustration for explaining a bit assignment for a non-edge of the eighth embodiment.

FIG. 24B is an illustration of 8-bit data corresponding to the non-edge area obtained in the above-mentioned seventh embodiment. The 8-bit data comprises six higher order bits which represent the LL component and two lower order bits which represent the flag information. Each of the two lower order bits among the six higher order bits is randomly either "1" or "0", and each of the two lower order bits is always "0".

In the above-mentioned arrangement of bits, the four most significant bits of each of the 8-bit data corresponding to the edge area and the non-edge area represent the four most significant bits of the LL component. These four most significant bits have a good correlation to each other. Each of the fifth and sixth order bits counted from the most significant bit corresponding to the edge area is "0" in most cases. However, each of the fifth and sixth order bits randomly takes either the value "1" or "0". That is, the good correlation is lost due to low correlation of the non-edge area. Additionally, each of the seventh and eighth order bits counted from the most significant bit has a good correlation in the non-edge area since it is always "0" for the non-edge area. However, the seventh and eighth order bits take randomly either "1" or ton for the edge area and, thus, correlation is lost due to the randomness for the edge area.

Accordingly, in the eighth embodiment, the fifth order bit and seventh order bit counted from the most significant bit of the 8-bit data corresponding to the non-edge area are exchanged, and the sixth order bit and eighth order bit counted from the most significant bit of the 8-bit data corresponding to the non-edge area are exchanged. According to this rearrangement of the order of bits, the codes (8-bit data) for the edge area and the non-edge area can be in a good correlation. This is because the first to fourth order bits counted from the most significant bit for the 8-bit data corresponding to both the edge-area and the non-edge area represent the four most significant bits of the LL component; each of the fifth and sixth order bits counted from the most significant bit is "0" in most cases for both the edge area and non-edge area; and each of the seventh and eighth order bits counted from the most significant bit is randomly either "1" or "0" for both the edge area and non-edge area. As a result, when the data in the page memory is stored in another memory for sorting, the data can be efficiently compressed by the entropy encoding method.

A description will now be given, with reference to FIG. 25 to 30, of a ninth embodiment of the present invention. FIG. 25 is a block diagram of a printer system which is an image processing system according to the ninth embodiment of the present invention.

The printer system shown in FIG. 25 comprises an image processing unit 2100, a host unit 2200 such as a personal computer, a hard disc drive unit (HDD) 2300 as a large capacity memory unit and a printer engine 2400.

The image processing unit 2100 comprises an RIP unit 2101, a frame memory 2102, a block dividing unit 2103, a wavelet transform unit 2104, a quantizing unit 2105, an encoding unit 2106, a reverse wavelet transform unit 2107, an edge degree calculating unit 2108 and a gain changing unit 2109.

A description will now be given of an operation of the above-mentioned components of the printer system shown in FIG. 25.

When image data is input from the host unit 2200 to the RIP unit 2101, the RIP unit 2101 transforms the image data to bit map data and stores the bit map data in the frame memory 2102. Then, the bit map data corresponding to a single page is transferred to the block dividing unit 2103. The block dividing unit 2103 divides the bit map data into a plurality of block data each having a predetermined size. The block data is sequentially transferred to the wavelet transform unit 2104. The wavelet transform unit 2104 transforms the block data to a transform factor, and sends the transform factor to the quantizing unit 2105 and the edge degree calculating unit 2108. The edge degree calculating unit 2108 calculates a slope of a rate of change in intensity in the block data based on the data supplied by the wavelet transform unit 2104. The result of the calculation is output to the gain changing unit 2109. The gain changing unit 109 changes a gain of the quantizing unit 2105 based on the intensity slope calculated by the edge degree calculating unit 2108. The quantizing unit 2105 quantizes the data supplied by the wavelet transform unit 2104 by a gain changed by the gain changing unit 2109. The quantized data is transferred to the encoding unit 2106. The encoding unit 2106 is provided with a buffer memory having a small capacity. The encoding unit 2106 performs a data compression (encoding) such as the QM-coder by using the buffer memory. The compressed data is sequentially written in the HDD 2300. The compressed data stored in the HDD 2300 is read upon request, and is supplied to the encoding unit 2106. Then, the compressed data is expanded by the encoding unit 2106 by using a reverse encoding method. Thereafter, the quantizing unit 2105 restores the expanded data by a reverse quantizing method, and supplies the factor to the reverse wavelet transform unit 2107. Accordingly, the image data is regenerated by the reverse wavelet transform unit 2107, and is output as a visible image by,the printer engine 2400.

Figure 26:
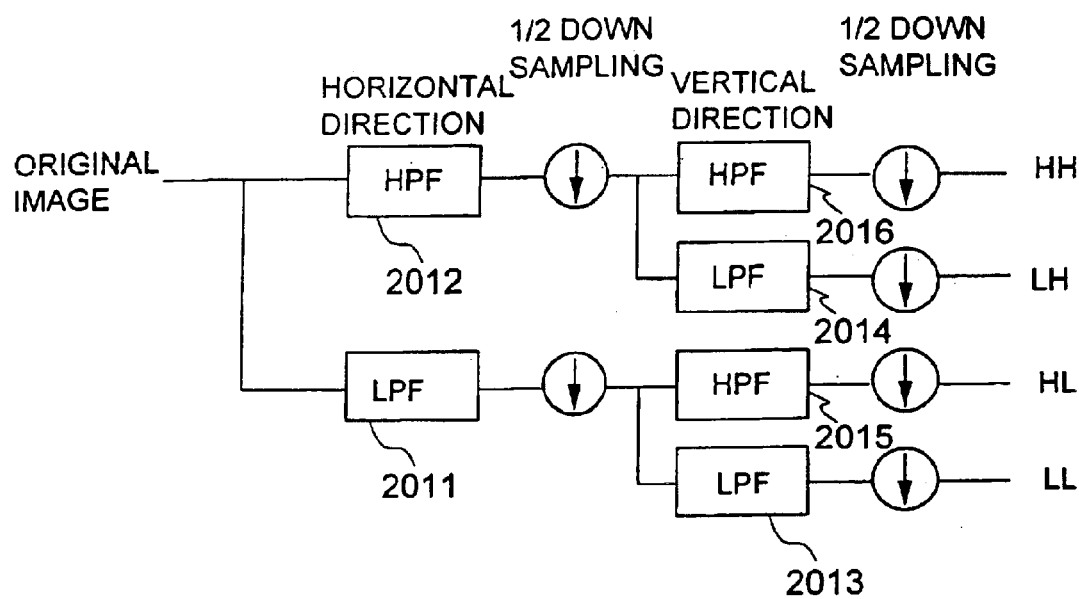
FIG. 26 is a circuit diagram of a wavelet transform unit shown in FIG. 25.

The image processing system according to the present embodiment uses a sub-band encoding method for two-dimensional image data. Accordingly, as shown in FIG. 26, the wavelet transform unit 2104 first separates a horizontal direction signal of the original image into a low-frequency signal and a high-frequency signal by using a low-pass filter (LPF) 2011 and a high-pass filter (HPF) 2012. Then, a vertical signal of the original image is subjected to the same process by low-pass filters 2013 and 2014 and high-pass filters 2015 and 2016. Thus, the original image data is separated into four bands, which are, horizontal high-band (HL), vertical high-band (LH), a diagonal high-band (HH) and a low band (LL) as, shown in FIG. 27.

Figure 27:
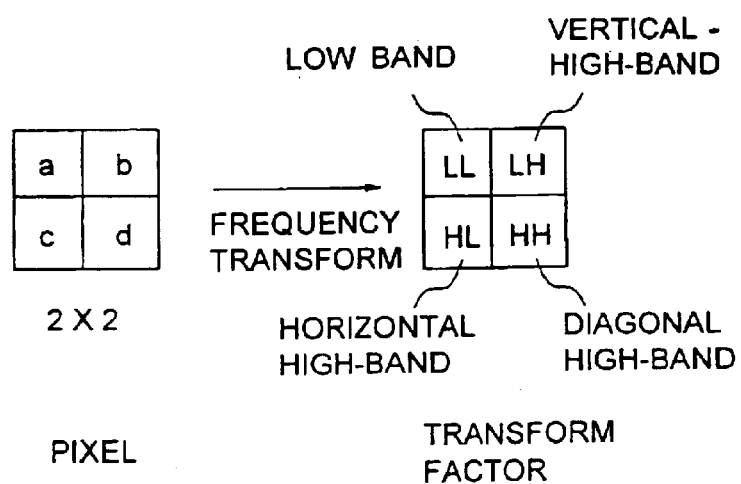
FIG. 27 is an illustration for explaining a pixel block and a frequency transform factor.

When the band separation is performed, the original image is divided into a plurality of 2×2 pixel matrix blocks as shown in FIG. 27. That is, each pixel block comprises two, horizontally arranged pixels and two vertically arranged pixels. First, the pixels in the pixel block are subjected to a (2, 2) transformation in the horizontal direction based on the following equation (11). In this operation, an LPF output s(n) and an HPF output d(n) are obtained. Thereafter, each of the outputs is subjected to a (2, 2) transformation in a vertical direction so that the transform factor shown in FIG. 27 is obtained. The horizontal high-band HL represents a high-frequency component of the original image in the horizontal direction. The vertical high-band LH represents a high-frequency component in a vertical direction. The diagonal high-band HH represents a high-frequency component in a diagonal direction. The low band LL represents a low-frequency component.

It should be noted that the original image may be divided into 4×4 matrix pixel blocks. In such a case, each of the components (HL, LH, HH, LL) includes four components.

The transform factor is restored to image data by a (2, 2) reverse transform based on the following equation (2) after being subjected to a quantizing process, an entropy encoding process and a reverse quantizing process described later.

"(2, 2) transform"

$$LPF: s(n)=\lfloor \{X(2n)+X(2n+1)\}/2 \rfloor$$

$$HPF: d(n)=X(2n)-X(2n+1) \qquad (11)$$

"(2, 2) reverse transform"

$$X(2n)=s(n)+\lfloor \{d(n)+1\}/2 \rfloor$$

$$X(2n+1)=s(n)-\lfloor d(n)/2 \rfloor \qquad (12)$$

Generally, a probability density function of high-frequency factors is approximated by the Laplacian distribution having a mean value of 0. Thus, the quantizing unit 2105 performs a non-linear quantization with respect to high-frequency factors so as to minimize average quantization noise power.

Figure 28:
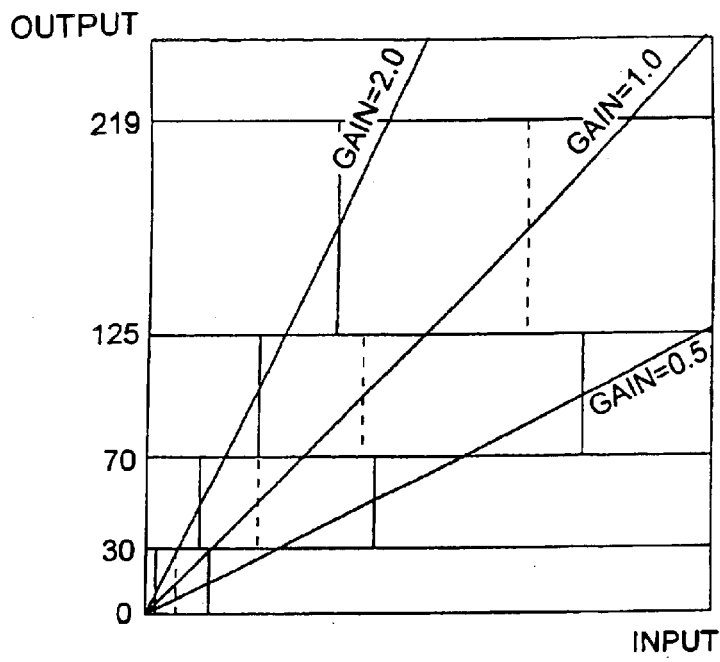
FIG. 28 is a graph showing a quantization characteristic.
Figure 29A:
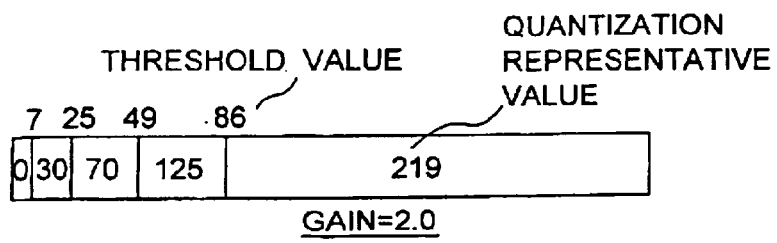
FIG. 29A is an illustration for explaining quantization representative values and ranges defined by threshold values when a gain of a quantizing unit is 2.0.
Figure 29B:
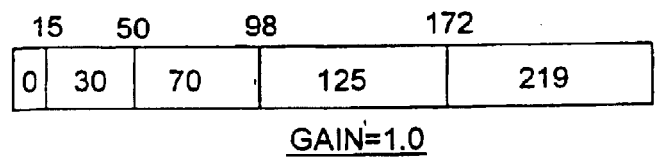
FIG. 29B is an illustration for explaining quantization representative values and ranges defined by threshold values when a gain of a quantizing unit is 1.0.
Figure 29C:
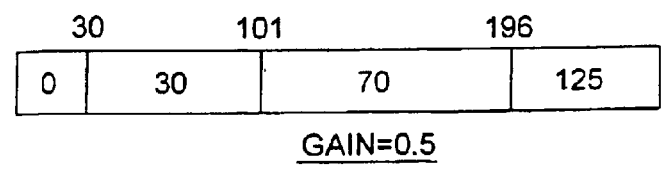
FIG. 29C is an illustration for explaining quantization representative values and ranges defined by threshold values when a gain of a quantizing unit is 0.5.

FIG. 28 is a graph showing a quantizing characteristic of the quantizing unit 2105. Actually, the transform factor takes either a plus value or a minus value. Since the plus and minus values are symmetric, only a plus side is shown in the figure. In the example shown in FIG. 28, 511 values between −255 and 255 are quantized into 9 values, which are, −219, −125, −70, −30, 0, 30, 70, 125, 219. These quantization representative values are compressed by n entropy encoding such as the Huffman encoding.

The quantizing unit 2105 determines one of ranges into which an input value falls, the ranges being defined by plurality of threshold values. Then, the quantizing unit 105 outputs one of the quantization representative values corresponding to the one of the ranges into which the input value falls.

If the gain of the quantizing unit 2105 is set to 1.0, the quantization representative value lies between the two adjacent;threshold values which defines the range. For example, in an example shown in FIG. 29B, the quantization representative value 70 is a value between the threshold values 50 and 98. However, if the gain is not 1.0, this condition is not established. That is, in an example shown in FIG. 29A in which the gain is set to 2.0 which is greater than 1.0, the quantization representative value 70 is a value within a range between 25 and 49. On the other hand, in an example shown in FIG. 29C in which the gain is set to 0.5 which is smaller than 1.0, the quantization representative value 70 is assigned to a range between 101 and 196.

If the gain of the quantizing unit 2105 is greater than 1.0, an output of the quantizing unit 2105 is always greater than an input thereof. On the contrary, if the gain of the quantizing unit 2105 is smaller than 1.0, the output of the quantizing unit 2105 is always smaller than the input thereof.

Sharpness of change in gradation of a block is proportional to a magnitude of an absolute value of the high-frequency factor. Thus, if the gain of the quantization 2105 with respect to the high-frequency factor is set to a value grater than 1.0, a slope of change in intensity of the image restored by a reverse transform becomes steeper. On the contrary, if the gain is set to a value less than 1.0, the slope becomes gentler.

If the gradation change in the block is sharp, the absolute value of the high-frequency factor is increased.

The high-frequency factor of an area having a sharp gradation change, such as a character image area or a line image area, takes a relatively large value as shown in FIG. 30A. However, the high-frequency factor of an area, in which the gradation change is gentle such as a photograph image, takes a relatively small value.

Accordingly, the edge degree calculating unit 2108 calculates a difference d between the largest component and the second largest component among the three components LH, HL and HH of the high-frequency factor. The calculated difference d is determined as an edge degree.

If the 4×4 pixel matrix is used, each of the three components of the high-frequency factor includes four components. Thus, one of the four components having the maximum absolute value is selected as a representative of the corresponding one of the three components. Then, a difference d between the largest representative value and the second largest representative value is calculated.

As mentioned above, in an area such as a character image area or a line image area, a differential filtering process is performed so as to increase an intensity slope of a contour of the image. On the other hand, in an area such as a photograph image in which an intensity slope is gentle, a smoothing filtering process is performed.

Conventionally, the filtering process for adjusting an image quality and a quantizing process are performed in different processes. However, in the present embodiment, the filtering process is performed in the data compressing process. This is achieved by the gain changing unit 2109 changing the gain of the quantizing unit 2105 in response o the edge degree, calculated by the edge degree calculating unit 2108. Thus, the process time is reduced and a manufacturing cost of the system can be reduced. The gain of the quantizing unit 2105 is changed by changing the threshold values thereof. New threshold values are obtained by dividing the threshold values at the gain of 1.0 by a desired gain.

Accordingly, if the desired gain is previously defined by a function of the edge degree, the new threshold values can be obtained sequentially in an order of high-frequency factor→edge degree→gain→new threshold value. Thus, the gain of the quantizing unit 2105 can be changed to the desired gain by the new threshold values.

When the gain of the quantizing unit 2105 is changed in response to a type of image area, there is no need to announce the quantization table used when the encoding is performed to the decoding side since the quantization representative value is fixed, that is, not changed. In the conventional technique such as disclosed in the aforementioned patent document, information with respect to the used quantization table must be stored together with the image data in the compressed data. However, in the present embodiment, such information regarding the quantization table is not necessarily stored as compressed data and, thus, the compression rate is increased.

If the information is omitted at a part which is not sensitive to a visual sense of human beings, the compression rate can be increased without changing an image quality. For example, a small intensity change adjacent to an area having a sharp intensity slope is hardly recognized. This effect is known as a mask effect. According to the mask effect, when a difference between edge degrees of adjacent blocks exceeds a predetermined value, the intensity change of the block having the smaller edge degree is hardly recognized.

Accordingly, when a difference between edge degrees of adjacent blocks exceeds a predetermined value, the edge degree calculating unit 2108 changes the smaller edge degree to a further smaller value. As a result, the gain of the quantizing unit 2105 is changed to a smaller value by the gain changing unit 2109 and, thereby, dispersion of the quantized value is decreased which result in an increase in the compression rate.

Additionally, in an area in which mesh point images or line images are randomly and densely populated, there may be no problem in a visual sense even when the smoothing process is performed. In many cases, a plurality of components of the high-frequency factor of such an area may be large values as shown in FIG. 30C.

In such a case, the edge degree calculating unit 2108 does set the largest component to the edge degree but set a difference between the largest component and the second largest component to the edge degree. Thereby, the edge degree is changed to a smaller value. As a result, the gain of the quantizing unit 2105 is changed to a smaller value by the gain changing unit 2109 and, thus, dispersion of the quantized value is decreased which results in an increase in a compression rate.

Figure 31:
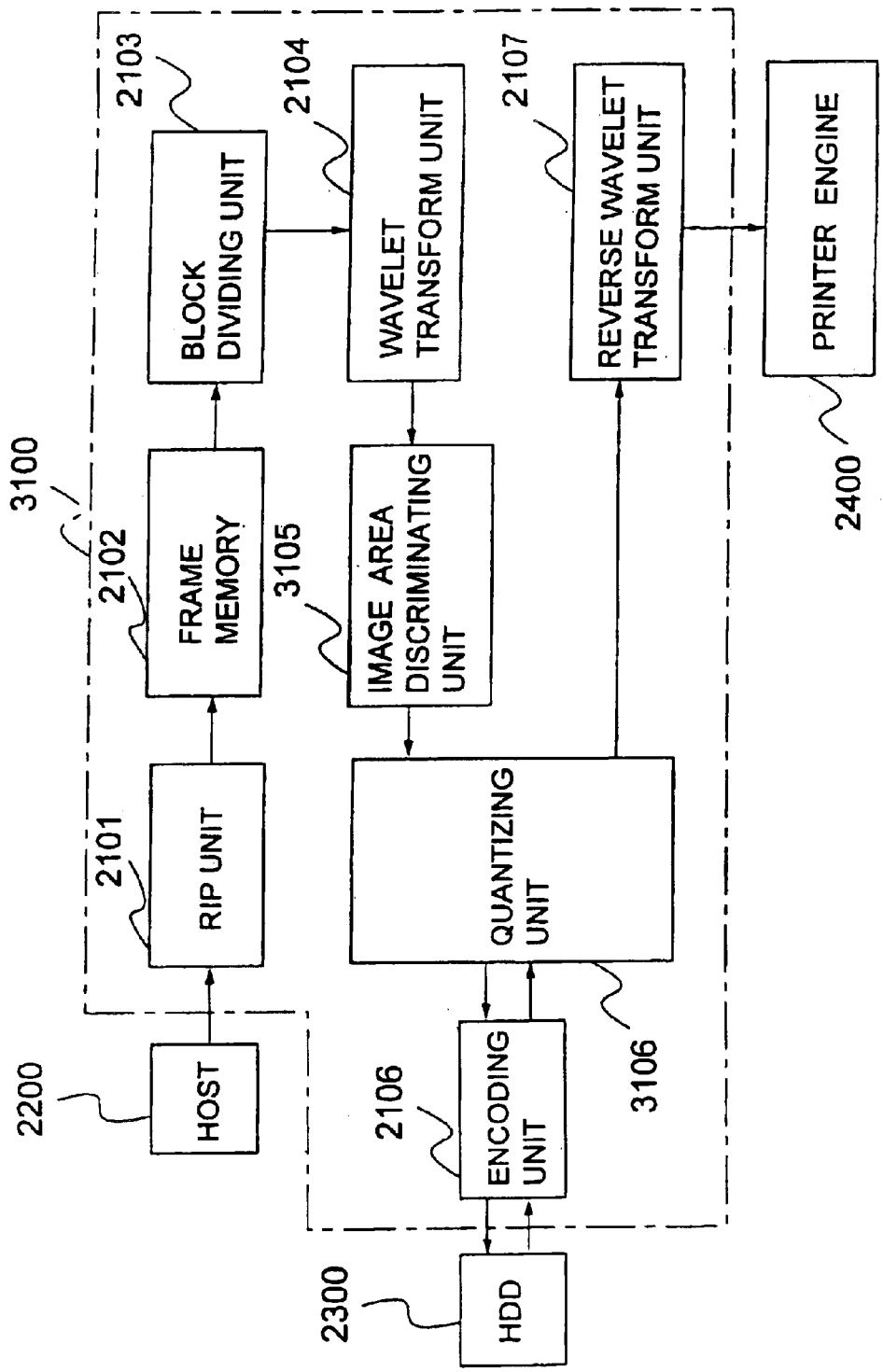
FIG. 31 is a block diagram of an image processing system according to a tenth embodiment of the present invention.

A description will now be given, with reference to FIG. 31, of a tenth embodiment of the present invention. FIG. 31 is a block diagram of a printer system which is an image processing system according to the tenth embodiment of the present invention. In FIG. 31, parts that are the same as the parts shown in FIG. 25 are give the same reference numerals.

The printer system shown in FIG. 31 comprises an image processing unit 3100, a host unit 2200 such as a personal computer, a hard disc drive unit (HDD) 2300 as a large capacity memory unit and a printer engine 2400.

The image processing unit 3100 comprises an RIP unit 2101, a frame memory 2102, a block dividing unit 2103, a wavelet transform unit 2104, an image area discriminating unit 3105, a quantizing unit 3106, an encoding unit 2106 and a reverse wavelet transform unit 2107.

A description will now be given of an operation of the above-mentioned components of the printer system shown in FIG. 31.

When image data is input from the host unit 2200 to the RIP unit 2101, the RIP unit 2101 transforms the image data to bit map data and stores the bit map data in the frame memory 2102. Then, the bit map data corresponding to a single page is transferred to the block dividing unit 2103. The block dividing unit 2103 divides the bit map data into a plurality of block data each having a predetermined size. The block data is sequentially transferred to the wavelet transform unit 2104. The wavelet transform unit 2104 transforms the block data to a transform factor, and sends the transform factor to the image area discriminating unit 3105 and the quantizing unit 3106. The image area discriminating unit 3105 determines whether each block corresponds to an edge area or a non-edge area based on the data from the wavelet transform unit 2104. The quantizing unit 3106 quantizes the data from the wavelet transform unit 2104 based on a result of a determination of the image area discriminating unit 3105. The quantized data is transferred to the encoding unit 2106. The encoding unit 2106 is provided with a buffer memory having a small capacity. The encoding unit 2106 performs a data compression (encoding) such as the QM-coder by using the buffer memory. The compressed data is sequentially written in the HDD 2300. The compressed data stored in the HDD 2300 is read upon request, and is supplied to the encoding unit 2106. Then, the compressed data is expanded by the encoding unit 2106 by using a reverse encoding method. Thereafter, the quantizing unit 3106 restores the expanded data by a reverse quantizing method, and supplies the factor to the reverse wavelet transform unit 2107. Accordingly, the image data is regenerated by the reverse wavelet transform unit 2107, and is output as a visible image by the printer engine 2400.

The image processing system according to the present embodiment uses a sub-band encoding method for two-dimensional image data. An operation of the sub-band encoding method used in this embodiment is the same as that of the ninth embodiment as shown in FIG. 26, and a description thereof will be omitted.

When the band separation is performed, the original image is divided into a plurality of 2×2 pixel matrix blocks (refer to FIG. 27). That is, each pixel block comprises two horizontally arranged pixels and two vertically arranged pixels. First, the pixels in the pixel block, are subjected to a (2, 6) transformation in the horizontal direction based on the following equations (13). In this operation, an LPF output s(n) and an HPF output d(n) are obtained. Thereafter, each of the outputs is subjected to a (2, 2) transformation in a vertical direction based on the above-mentioned equation (11) so that the transform factor shown in FIG. 27 is obtained. The horizontal high-band HL represents a high-frequency component of the original image in the horizontal direction. The vertical high-band LH represents a high-frequency component in a vertical direction. The diagonal high-band HH represents a high-frequency component in a diagonal direction. The low band LL represents a low-frequency component.

"(2, 6) transform"

$$LPF: s(n)=\lfloor\{X(2n)+X(2n+1)\}/2\rfloor$$

$$HPF: d(n)=X(2n)-X(2n+1)+\lfloor\{-S(n-1)+s(n+1)+2\}/4\rfloor \quad (13)$$

"(2, 6) reverse transform $$X(2n)=s(n)+\lceil\{d(n)-\lfloor[-S(n-1)+s(n+1)+2]/4\rfloor\}/2\rceil$$

$$X(2n+1)=s(n)-\lfloor\{d(n)-\lfloor[-S(n-1)+s(n+1)+2]/4\rfloor\}/2\rfloor \quad (14)$$

The image area discriminating unit 3105 determines whether each block corresponds to an edge area or a non-edge area based on the spatial gradation change in the block. If the gradation change is sharp, an absolute value of the high-frequency component is large. That is, if the absolute value of the high-frequency component is greater than a predetermined value, is can be determined as an edge area. Otherwise, it can be determined as a non-edge area. For example, blocks satisfying the following relationship (15) are determined as edge area blocks, and blocks other than the edge area blocks are determined as non-edge area blocks.

$$31<|HL| \text{ or } 31<|LH| \text{ or } 31<|HH| \quad (15)$$

Generally, a probability density function of high-frequency factors is approximated by the Laplacian distribution having a mean value of 0. Thus, the quantizing unit 3106 performs a non-linear quantization with respect to high-frequency factors so as to minimize average quantization noise power.

Figure 32A:
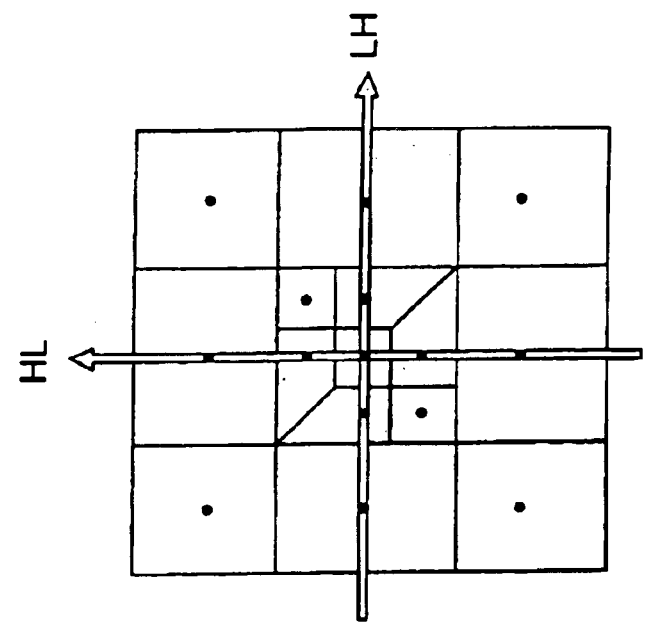
FIGS. 32A is an illustration showing an example of a two-dimensional vector quantization using 7 quantization values.
Figure 32B:
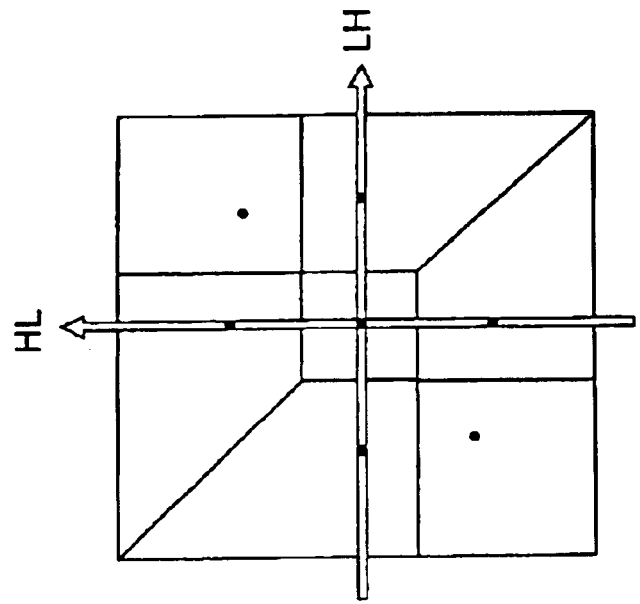
FIGS. 32B is an illustration showing an example of a two-dimensional vector quantization using 15 quantization values.

FIG. 32A shows an example of a two-dimensional vector quantization using the components HL and LH, the vector quantization being represented by 7 values (3 bits). FIG. 32B shows an example of a two-dimensional vector quantization using the components HL and LH, the vector quantization being represented by 15 values (4 bits).

Since the high-frequency component HH has less importance in a visual sense, the high-frequency component is discarded in the present embodiment. Additionally, the probability density function of the low-frequency component LL fluctuates for images, and there is no correlation. Thus, the probability density function of the low-frequency component LL is regarded as a uniform distribution, and is subjected to a linear quantization. If the component LL is 8 bits and a 3-bit quantization is performed, five least significant bits are deleted. If a 4-bit quantization is performed, four least significant bits are deleted.

The quantizing unit 3106 changes a ratio of numbers of bits assigned to the high-frequency component and the low-frequency component while the number of bits assigned to a single block is maintained to be the same. That is, a greater number of bits are deleted from the high-frequency component of the edge area, whereas a smaller number of bits are deleted from the high-frequency component of the edge area. However, the number of bits of the high-frequency component of the edge area is equal to the number of bits of the low-frequency component of the non-edge area.

Figures 33, 34:
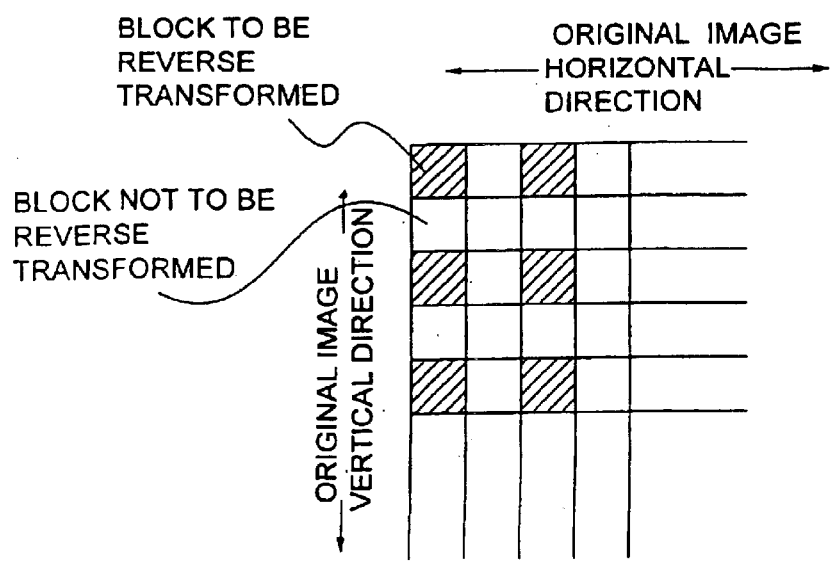
FIG. 33 is an illustration for explaining an example of a bit arrangement for each area.
FIG. 34 is an illustration of a part of an original image.

FIG. 33 is an illustration for explaining an example of a bit arrangement for each area. In the example shown in FIG. 33, 8 bits are always assigned to a single block. For the edge area, 4 bits are assigned to the high-frequency component, 3 bits to the low-frequency component, and 1 bit to area information. For the non-edge area, 3 bits are assigned to the high-frequency component, 4 bits to the low-frequency component, and 1 bit to area information.

As mentioned above, the encoding unit 2106 produces data for compensating errors so as to produce an image having higher image by complementing the data represented by a quantization factor having a fixed length for a single block. For example, a difference between the original image and the restored image is previously obtained, the restored image being obtained from the quantizing factor having a fixed length by being subjected to a reverse transform using the equations (12) and (14). Then, the quantization factor and data (error data) corresponding to the above-mentioned difference are encoded by an entropy encoding method.

The above-mentioned quantization factor and the error data are compressed (encoded) by a variable length reverse encoding method such as the QM-coder. When an image is rotated by a printer, data structure is preferably a fixed length. Thus, in such a case, a rotation of the image is performed prior to the entropy encoding.

As mentioned above, the compressed data read from the HDD 2300 is reverse encoded (decoded) by the encoding unit 2106, and is reverse quantized by the quantizing unit 3106 so as to return to the transform factor. The transform factor is subjected to a reverse transform by the reverse wavelet transform unit 2107 so as to restore the image data. At this time, both the quantization factor and the error data are decoded so as to restore the transform factor. Then, the transform factor is subjected to reverse transform and, thereby, the original image can be almost completely restored. Additionally, an image having an image quality at a certain level can be restored by reverse transforming the quantized factor having a fixed length, that is, both the high-frequency component and the low-frequency component.

Additionally, when only the high-frequency component of the quantized factors with a fixed length is reverse transformed for the edge area, and when only the low-frequency component of the quantized factor with a fixed length is reverse transformed for the non-edge area, image quality is considerably deteriorated, but a feature of the original image can be still maintained. Such a restored image can be used for a trial printing.

Further, if the decoding process of the image is not performed for all blocks but for every other block as shown in FIG. 34, image quality and resolution may be deteriorated, but the restored image can still provide a certain feature of the original image. Such a restored image can be used as an icon on a display unit.

The present invention is not limited to the specifically disclosed embodiments, and variations and modifications may be made without departing from the scope of the present invention.

The present application is based on Japanese priority applications No. 9-118207 filed on May 8, 1997, No. 9-156006 filed on May 29, 1997 and No. 9-156007 file on May 29, 1998, the entire contents of which are hereby incorporated by reference.

What is claimed is:

1. An image processing system comprising:
    a dividing unit dividing image data into a plurality of n×m pixel matrix block data, where n and m are integers;
    a transform unit transforming each pixel in the n×m pixel matrix block data by a frequency transform method so as to produce a transform factor including a high-frequency component and a low-frequency component;
    an image area discriminating unit for determining whether the block being processed corresponds to an edge area or a non-edge area based on the transform factor output from said transform unit;
    a quantizing unit quantizing the transform factor for the edge area and the transform factor for the non-edge area by different methods; and
    an encoding unit encoding an output of said quantizing unit by an entropy encoding method, wherein
    a total of a number of bits of the high-frequency component and a number of bits of the low-frequency is the same regardless of types of the edge area or the non-edge area, and a number of bits of the high-frequency component for the edge area is the same as a number of bits of the low-frequency component of the non-edge area.

2. The image processing system as claimed in claim 1, wherein said encoding unit encodes error data generated by said quantizing unit.

3. The image processing system as claimed in claim 1, wherein an encoding of the image for the edge area is performed by using only the high-frequency component, and an encoding of the image for the non-edge area is performed by using only the low-frequency component.

4. The image processing system as claimed in claim 1, wherein every other block data is used for restoring an original image.

5. An image processing method comprising the steps of dividing image data into a plurality of n×m pixel matrix block data, where n and m are integers; transforming each pixel in the n×m pixel matrix block data by a frequency transform method so as to produce a transform factor including a high-frequency component and a low-frequency component;
    determining whether the block being processed corresponds to an edge area or a non-edge area based on the transform factor output from said transform unit;
    quantizing the transform factor for the edge area and the transform factor for the non-edge area by different methods; and
    encoding an output of said quantizing unit by an entropy encoding method, wherein
    a total of a number of bits of the high-frequency component and a number of bits of the low-frequency is the same regardless of types of the edge area or the non-edge area, and a number of bits of the high-frequency component for the edge area is the same as a number of bits of the low-frequency component of the non-edge area.

* * * * *